(12) United States Patent
Simard et al.

(10) Patent No.: US 7,418,128 B2
(45) Date of Patent: Aug. 26, 2008

(54) ELASTIC DISTORTIONS FOR AUTOMATIC GENERATION OF LABELED DATA

(75) Inventors: Patrice Y. Simard, Bellevue, WA (US); David W. Steinkraus, Sante Fe, NM (US)

(73) Assignee: Microsoft Corporation, Redmond, WA (US)

( * ) Notice: Subject to any disclaimer, the term of this patent is extended or adjusted under 35 U.S.C. 154(b) by 947 days.

(21) Appl. No.: 10/631,511

(22) Filed: Jul. 31, 2003

(65) Prior Publication Data

US 2005/0025355 A1 Feb. 3, 2005

(51) Int. Cl.
*G06K 9/62* (2006.01)

(52) U.S. Cl. .............. 382/159; 382/156; 382/187; 382/224

(58) Field of Classification Search ........ 382/156, 382/159, 187, 224, 227, 228
See application file for complete search history.

(56) References Cited

U.S. PATENT DOCUMENTS

| | | | | |
|---|---|---|---|---|
| 3,096,833 A | 7/1963 | Bodine | ............... | 175/156 |
| 3,249,162 A | 5/1966 | Brown | ............... | 175/96 |
| 3,499,293 A | 3/1970 | Kato | ............... | 173/49 |
| 3,734,209 A | 5/1973 | Haisch et al. | ............... | 175/171 |
| 3,835,943 A | 9/1974 | Bray | ............... | 175/171 |
| 3,878,686 A | 4/1975 | Hageman et al. | ............... | 61/36 R |
| 3,979,917 A | 9/1976 | Crafton | ............... | 61/42 |
| 4,006,665 A | 2/1977 | Klemm | ............... | 91/278 |
| 4,023,628 A | 5/1977 | Bodine | | |
| 4,073,353 A | 2/1978 | Bodine | | |
| 4,100,983 A | 7/1978 | Herrmann et al. | ............... | 175/383 |
| 4,403,665 A | 9/1983 | Bodine | | |
| 4,574,875 A | 3/1986 | Rawlings et al. | ............... | 165/45 |
| 4,595,059 A | 6/1986 | Katagiri et al. | ............... | 175/171 |
| 4,662,459 A | 5/1987 | Bodine | | |
| 4,693,325 A | 9/1987 | Bodine | | |
| 4,719,978 A | 1/1988 | Klemm | ............... | 175/113 |
| 4,840,238 A | 6/1989 | Klemm | ............... | 175/92 |
| 4,905,777 A | 3/1990 | Spies | ............... | 175/73 |
| 4,909,323 A | 3/1990 | Hastings | ............... | 166/242 |
| 4,912,941 A | 4/1990 | Buchi | ............... | 62/260 |
| 4,981,396 A | 1/1991 | Albertson et al. | ............... | 405/178 |
| 5,152,342 A | 10/1992 | Rankin et al. | ............... | 166/286 |
| 5,205,366 A | 4/1993 | Klemm | ............... | 175/390 |
| 5,255,590 A | 10/1993 | Klemm | ............... | 91/516 |
| 5,263,545 A | 11/1993 | Tudora et al. | ............... | 175/171 |
| 5,269,107 A | 12/1993 | Klemm | ............... | 52/115 |

(Continued)

FOREIGN PATENT DOCUMENTS

DE 3114262 11/1982

OTHER PUBLICATIONS

New Rigs and Accessories, Water Well Journal, vol. I, No. 10, Oct. 1996; pp. 33-37.

(Continued)

*Primary Examiner*—Gregory M Desire
(74) *Attorney, Agent, or Firm*—Amin, Turocy & Calvin, LLP

(57) ABSTRACT

A system that facilitates generation of data that can be employed in connection with training a classifier. The system comprises a component that receives a data set that is employed in connection with training the classifier, and an expansion component that applies elastic distortion algorithm(s) to a subset of the data set to generate additional labeled training data.

39 Claims, 28 Drawing Sheets

U.S. PATENT DOCUMENTS

| | | | |
|---|---|---|---|
| 5,291,956 A | 3/1994 | Mueller et al. | 175/67 |
| 5,350,023 A | 9/1994 | Klemm | 173/17 |
| 5,411,085 A | 5/1995 | Moore et al. | 166/242 |
| 5,417,290 A | 5/1995 | Barrow | |
| 5,419,403 A | 5/1995 | Klemm | 173/115 |
| 5,435,387 A | 7/1995 | Roberts | 166/242 |
| 5,435,395 A | 7/1995 | Connell | 166/384 |
| 5,477,914 A | 12/1995 | Rawlings | 165/45 |
| 5,501,287 A | 3/1996 | Loeser | 175/173 |
| 5,549,170 A | 8/1996 | Barrow | |
| 5,562,169 A | 10/1996 | Barrow | |
| 5,590,715 A | 1/1997 | Amerman | 166/290 |
| 5,611,021 A * | 3/1997 | Kadowaki et al. | 706/35 |
| 5,639,184 A | 6/1997 | DeMasters | 405/156 |
| 5,752,572 A | 5/1998 | Baiden et al. | 175/26 |
| 5,765,643 A | 6/1998 | Shaaban et al. | 166/384 |
| 5,803,187 A | 9/1998 | Javins | 175/415 |
| 5,812,068 A | 9/1998 | Wisler et al. | |
| 5,912,986 A * | 6/1999 | Shustorovich | 382/156 |
| 6,000,459 A | 12/1999 | Jeppesen | 165/45 |
| 6,041,862 A | 3/2000 | Amerman | 166/290 |
| 6,119,083 A * | 9/2000 | Hollier et al. | 704/243 |
| 6,164,391 A | 12/2000 | Wurm | 175/52 |
| 6,205,247 B1 * | 3/2001 | Breuer et al. | 382/228 |
| 6,244,360 B1 | 6/2001 | Steinsland | 175/52 |
| 6,250,371 B1 | 6/2001 | Amerman et al. | 165/45 |
| 6,251,179 B1 | 6/2001 | Allan | 106/719 |
| 6,276,438 B1 | 8/2001 | Amerman et al. | 165/45 |
| 6,502,636 B2 | 1/2003 | Chatterji et al. | 166/293 |
| 6,564,176 B2 * | 5/2003 | Kadtke et al. | 702/189 |
| 6,588,509 B2 | 7/2003 | Allyn et al. | 166/340 |
| 6,739,410 B2 | 5/2004 | Smith et al. | 175/55 |
| 6,993,189 B2 * | 1/2006 | Jojic et al. | 382/197 |
| 2003/0010652 A1 | 1/2003 | Hunt | 205/742 |
| 2005/0025355 A1 * | 2/2005 | Simard et al. | 382/159 |
| 2006/0110040 A1 * | 5/2006 | Simard et al. | 382/181 |
| 2006/0147107 A1 * | 7/2006 | Zhang et al. | 382/159 |
| 2006/0217968 A1 * | 9/2006 | Burges et al. | 704/205 |
| 2007/0140561 A1 * | 6/2007 | Abdulkader et al. | 382/187 |

OTHER PUBLICATIONS

Casing Drilling Making Major Strides, The American Oil & Gas Reporter, Apr. 2002, pp. 87-89, 91, HRB 605-Me, Hutte & Co., May 2000.

Hydraulic Hammer HB 60A, Krupp Berco Bautechnik, Oct. 2000.

. . . present throughout the world, Hutte & CO., May 2000.

Casing Drilling Making Major Strides, The American Oil & Gas Reporter, Apr. 2002, pp. 87-89, 91.

PCT/GB2004/002552; Int'l Search Report, 4 pp.; and PCT Written Opinion, 6 pp.

Patrice Y. Simard, Dave Steinkraus and John C. Platt, "Best Practice for Convolutional Neural Networks Applied to Visual Document Analysis", International Conference on Document Analysis and Recognition, Aug. 2003, pp. 958-962.

* cited by examiner

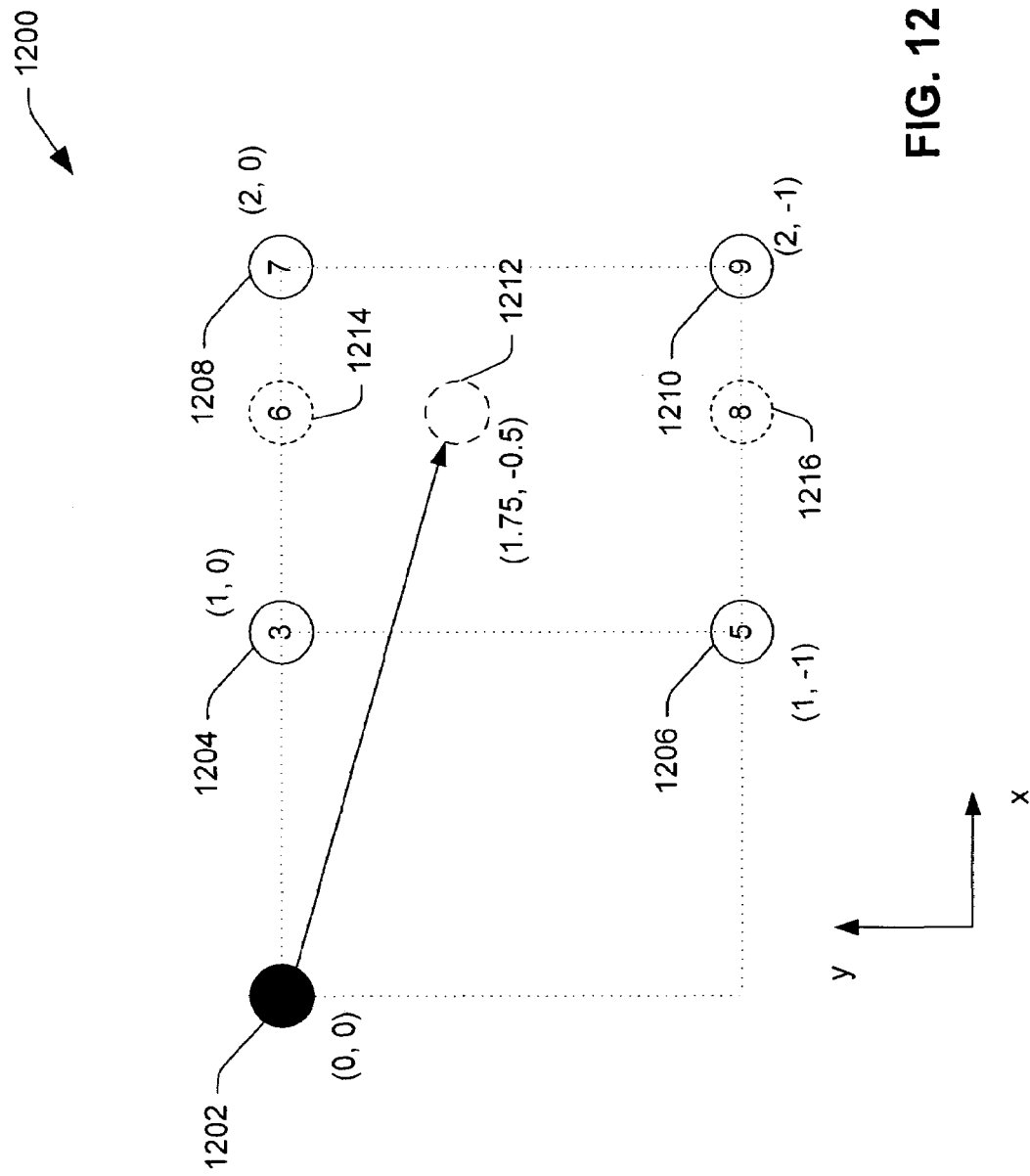

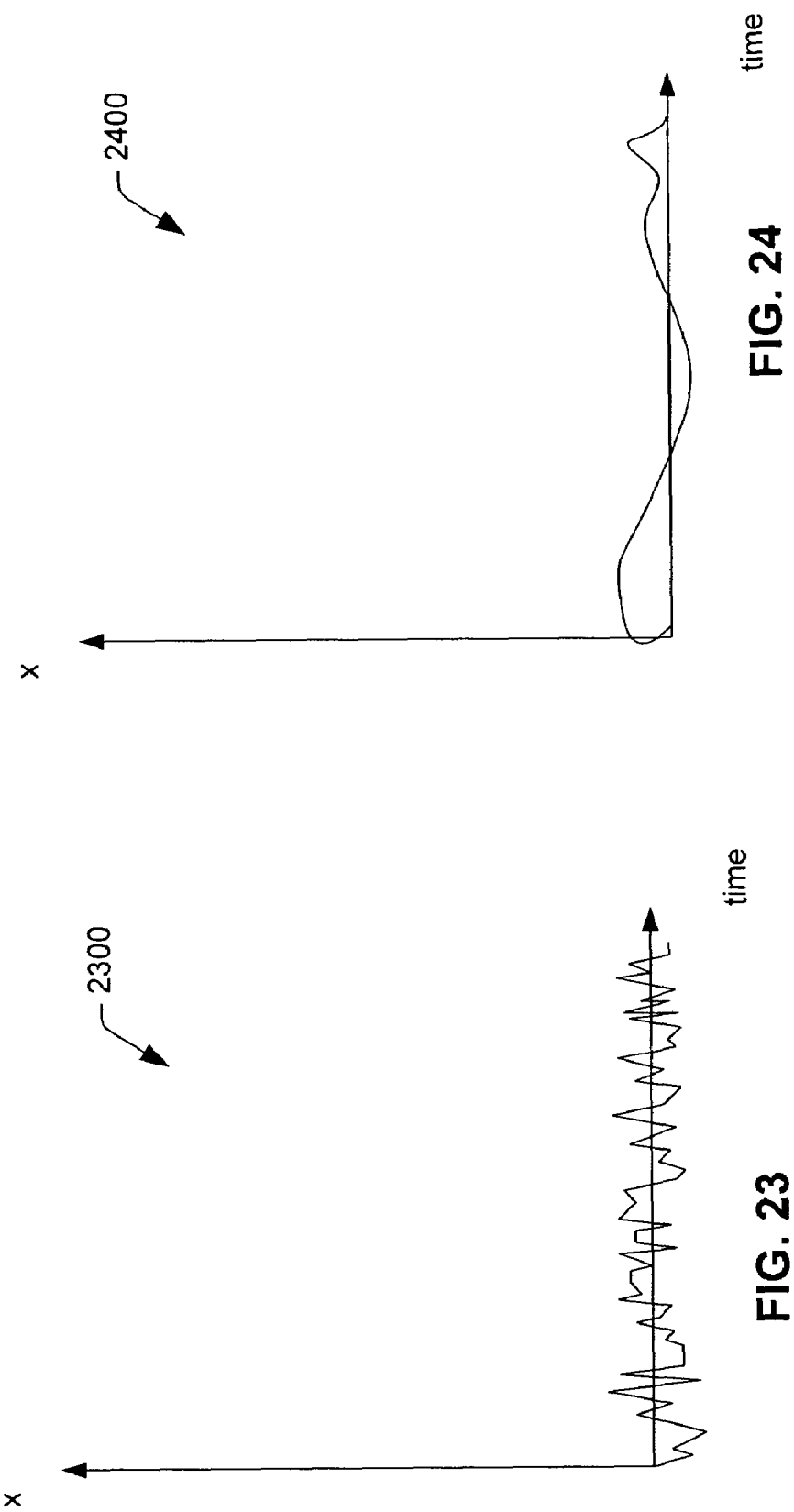

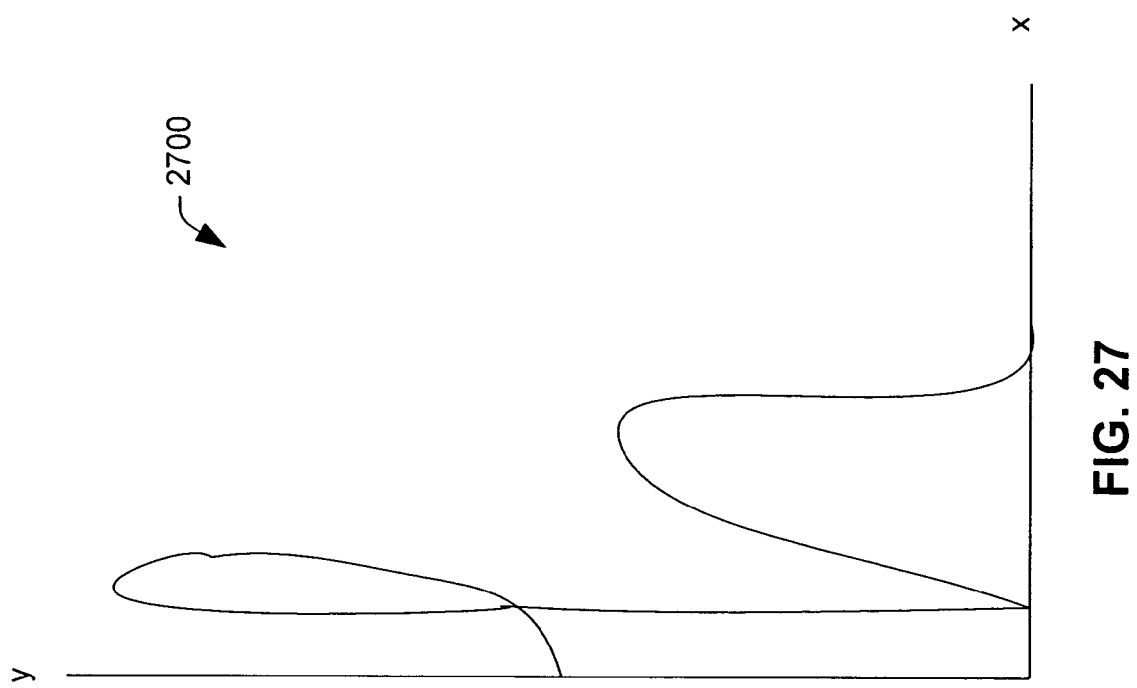

ELASTIC DISTORTIONS FOR AUTOMATIC GENERATION OF LABELED DATA

TECHNICAL FIELD

The present invention relates to generating data for training algorithm(s). More particularly, the invention relates to a system and/or methodology that facilitates generation of labeled data for training algorithms via elastic distortions.

BACKGROUND OF THE INVENTION

Computers have become an integral part of society. Every day people become more dependent on computers to facilitate both work and leisure activities. A significant drawback to computing technology is its "digital" nature as compared to the "analog" world in which it functions. Computers operate in a digital domain that requires discrete states to be identified in order for information to be processed. In simple terms, information generally must be input into a computing system with a series of "on" and "off" states (e.g., binary code). However, humans live in a distinctly analog world where occurrences are never completely black or white, but always seem to be in between shades of gray. Thus, a central distinction between digital and analog is that digital requires discrete states that are disjunct over time (e.g., distinct levels) while analog is continuous over time. As humans naturally operate in an analog fashion, computing technology has evolved to alleviate difficulties associated with interfacing humans to computers (e.g., digital computing interfaces) caused by the aforementioned temporal distinctions.

Handwriting, speech, and object recognition technologies have progressed dramatically in recent times, thereby enhancing effectiveness of digital computing interface(s). Such progression in interfacing technology enables a computer user to easily express oneself and/or input information into a system. As handwriting and speech are fundamental to a civilized society, these skills are generally learned by a majority of people as a societal communication requirement, established long before the advent of computers. Thus, no additional learning curve for a user is required to implement these methods for computing system interaction.

Effective handwriting, speech, and/or object recognition systems can be utilized in a variety of business and personal contexts to facilitate efficient communication between two or more individuals. For example, an individual at a conference can hand-write notes regarding information of interest, and thereafter quickly create a digital copy of such notes (e.g., scan the notes, photograph the notes with a digital camera, . . . ). A recognition system can be employed to recognize individual characters and/or words, and convert such handwritten notes to a document editable in a word processor. The document can thereafter be emailed to a second person at a distant location. Such a system can mitigate delays in exchanging and/or processing data, such as difficulty in reading an individual's handwriting, waiting for mail service, typing notes into a word processor, etc.

Conventional handwriting, speech, and/or object recognition systems and/or methodologies typically utilize one or more programs that are customized for particular actions and/or applications. For example, a customized program for determining identification of a particular character could employ a plurality of functions that search for particular features in order to identify such character. A program that identifies a "d" can first determine that a line of particular height exists, and thereafter determine that a single loop left of the line is present to facilitate identifying the "d". While such customized programs have improved over time, empirical data suggests that statistical systems and/or methods outperform such customized programs.

Previously, statistical methods have not been employed in handwriting, speech, and/or object recognition systems due to limits in processing speed, bandwidth, and storage area, as effective statistical systems and/or methods utilized to recognize handwriting, speech, and/or objects require a substantial amount of labeled data to train a learning algorithm. As advances in technology have alleviated concerns regarding computing limits, an increase in popularity of statistical systems and/or methods has occurred. However, collecting labeled data utilized to train a learning algorithm employed in statistical recognition systems and/or methods remains a tedious and expensive task. For example, several instances of a same character must be collected and labeled as such character in order to effectively train a learning algorithm.

In view of at least the above, there exists a strong need in the art for a system and/or methodology to facilitate generating labeled data to train a learning algorithm employed in a statistical handwriting, speech, and/or object recognition system and/or method.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention facilitates improved performance of classifier(s) employed to recognize and/or analyze handwriting, speech, and/or objects via generating labeled training data based upon initial labeled data. Improved performance occurs due to creation of a substantial amount of training data (e.g., performance of classifiers employing statistical methods improves as amount of training data increases). The present invention provides further benefits by elastically distorting initial labeled data to generate additional labeled training data, as elastic distortions imitate random variation associated with human activity, such as writing, speaking, drawing, etc. Moreover, cost of collecting training data is drastically reduced, as the present invention facilitates generation of a substantial amount of labeled training data from a smaller set of collected labeled data than that required by conventional data-generation systems. A reduced set of collected labeled data is adequate as the present invention can utilize training data that is generated via elastic distortion as input labeled data (e.g., generated labeled data can be employed as collected data and thereafter further distorted). The generated labeled training data should remain within bounds of plausibility because generating patterns not likely to be observed in natural conditions will unnecessarily make training more difficult.

Generating distortion is in general much easier than undoing a distortion. For instance, it is much easier to add noise to an image than to remove it. A clever strategy is to use learning algorithms (classifiers) to "learn" inverse problems. For example, given a classification task, the present invention can generate training data via elastic distortion(s) and let the learning algorithm infer corresponding transformation invariance by repetitively training the learning algorithm with distorted pattern(s). The learning algorithms do not perform inverse elastic distortion(s), but through training, the classifiers become invariant and robust to the distortions, effectively nullifying effects of the distortions. The benefit of this strategy is to improve recognition accuracy without having to solve the inverse distortion problem. For the purpose of the invention, we apply this strategy to learn elastic distortion invariance.

The present invention facilitates elastic distortion in one-dimension and two-dimensions, wherein data elastically distorted can be utilized to train a classifier. In two-dimensional elastic distortion, an image is distorted via a two-dimensional displacement field. For example, pixel(s) defining the image are assigned randomly generated numbers for displacement of pixel coordinates in dimensions defining the image (e.g., an x and y direction). In accordance with one aspect of the present invention, a random number generator can be employed to output random numbers about a zero displacement (e.g., −1 and 1, −2 and 2, . . . ) to enable displacement of pixel(s) in positive and negative direction(s) relative to their initial position.

Because purely random displacement of data in a digital domain does not correlate to randomness associated with human activity that the data represents, a low-pass filter can be applied to a purely random displacement field, causing the displacement field to be locally constant with a random direction. In accordance with one aspect of the present invention, the displacement field can be convolved with a Gaussian of appropriate standard deviation σ, thus filtering such displacement field. Alternatively, the displacement field can be convolved with various other shapes (e.g., a square, triangle, . . . ) to thereby filter the displacement field. It is to be understood, however, that any suitable low-pass filter can be utilized in connection with filtering the displacement field. In accordance with another aspect of the invention, the displacement field is obtained by using a smooth function, for instance a low order polynomial, whose coefficients are a function of random numbers. Thereafter the displacement field can be multiplied by a scalar to generate a desirable amount of elastic distortion.

In accordance with yet another aspect of the present invention, the random field is generated at low resolution, and then over-sampled and interpolated to obtain a field at higher resolution.

One important aspect of the invention is that the displacement fields are locally correlated, e.g., the directions of the displacement from neighboring locations are similar, hence the name "elastic" distortion. There are many other possible ways to generate locally correlated fields.

Due to a discrete nature of computer pixels, a displacement may yield a position that does not correspond to any pixel. For instance, a translation by 0.5 pixel would land exactly between two pixel locations. In accordance with another aspect of the present invention, the displaced pixel(s) can be interpolated to compute desirable color level(s) for pixel(s) defining the image.

When data is collected from an electronic pen and a pressure-sensitive screen, such as can be found in a portable computing device, the pen trajectory can be described by a position which is a function of time, e.g. by x(t) and y(t) where t represent a time index. Displacement distortions can be generated by adding random positive or negative displacement dx(t) and dy(t), using a random number generator, to the initial trajectory x(t) and y(t). As in two-dimensional elastic distortion, the displacement values can be filtered via a smoothing function such as a low-pass filter, thus generating smooth displacement with respect to time (e.g., displacement will be smooth locally with random direction).

The smoothing function is applied with respect to time and is one-dimensional, in contrast with the pixel based two-dimensional elastic distortion. In accordance with an aspect of the present invention, one-dimensional displacement values can be scaled via multiplying smoothed displacements by a scalar, thereby generating an optimal elastic deformation. Thereafter the functions x(t) and y(t) can be re-generated according to the displaced locations. Such one-dimensional distortion facilitates generation of a substantial amount of additional labeled data that can be utilized in connection with training a classifier employed to recognize and/or analyze handwriting, speech, and/or objects.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 12 illustrates an interpolation technique that can be employed in accordance with an aspect of the present invention.

FIG. 23 is a graph representing displacement distortions in accordance with an aspect of the present invention.

FIG. 24 is a graph representing displacement distortions after being smoothed with respect to time in accordance with an aspect of the present invention.

FIG. 27 illustrates a trajectory that has been elastically distorted in one dimension with respect to time in accordance with an aspect of the present invention.

DETAILED DESCRIPTION OF THE INVENTION

Figure 1:
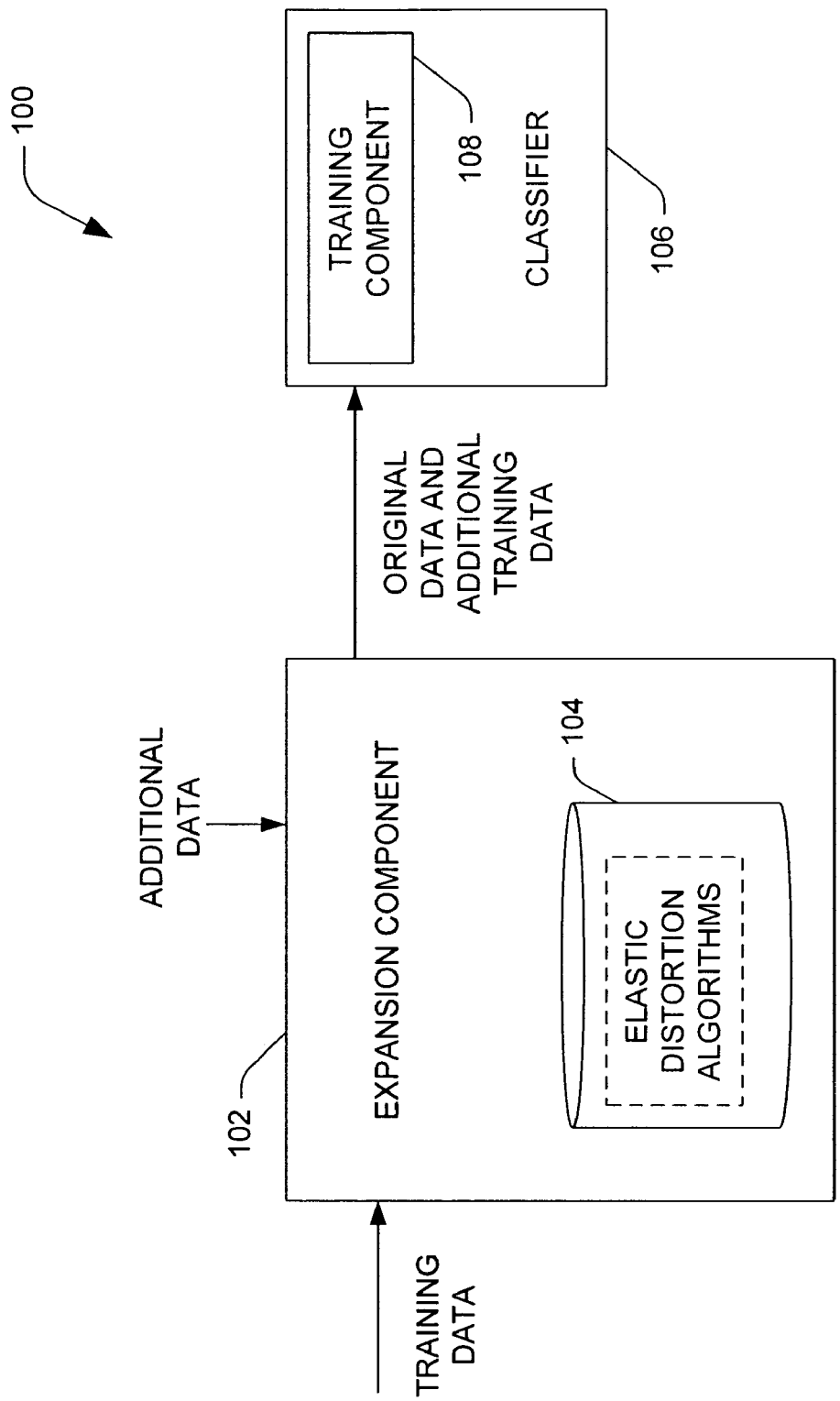
FIG. 1 is a block diagram of a system that facilitates generation of training data via elastic distortion in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring now to the drawings, FIG. 1 illustrates a high-level system overview in connection with one particular aspect of the subject invention. The present invention relates to a novel system 100 for generating labeled data associated with handwriting, speech, and/or object analysis and/or recognition. The system 100 facilitates elastically distorting labeled data representing images (e.g., objects, handwritten characters or collection of characters, . . . ) and/or sound (e.g. voice recognition, word recognition, . . . ) to mimic occurrences of distortions in real-life. For example, elastic distortion of a written character can represent natural variations when the character is actually written by a human (e.g., quivers of a hand, muscle cramps, . . . ). Such distortions can thereafter be employed in connection with a statistical system and/or method for recognizing handwriting, speech, and/or objects.

An initial set of labeled training data can be received by an expansion component 102 employed to generate additional labeled data via elastically distorting the training data. The expansion component 102 can be associated with elastic distortion algorithms 104 that facilitate elastically distorting the training data. The elastic distortion algorithms 104 can manipulate data in one-dimension (e.g., manipulate trajectories x(t) and y(t) independently) as well as multiple dimensions (e.g., manipulate a two-dimensional image without associated time data). In a two-dimension case, the expansion component 102 receives a two-dimensional image in a pixel state, such as a digital image of a character, object, sound wave, etc. One or more pixels defining the image can then be displaced from an original location to a new location, and the image can be regenerated (thereby creating a new distorted image).

Elastic deformations are generated in two-dimensions by creating random displacement fields around initial position(s) of pixel(s). For example, a random number generator can be employed to facilitate generation of a random displacement field by outputting a number between threshold values (e.g., negative one and one) for pixel(s) defining the image. More particularly, a random number can be generated for each coordinate defining location of pixel(s) (e.g., two coordinates for typical digital images), thereby creating a random displacement field for the image.

In accordance with one aspect of the present invention, Δx(x,y)=rand(−1, 1) and Δy(x,y)=rand(−1, 1), wherein rand (−1, 1) is a random number between −1 and 1 generated with a uniform distribution.

Generating a purely random field, however, does not simulate randomness of human variation when writing and/or speaking, as an image can become discontinuous upon random displacement of pixels. A low-pass filter can be provided to mitigate discontinuity in the image (e.g., the random field is smoothed via filtering high-frequency displacements). In accordance with one aspect of the present invention, the random fields Δx and Δy can be smoothed via convolving such random fields with a Gaussian of standard deviation σ (in pixels). If σ is chosen sufficiently large, resulting values will tend towards zero as average of a summation of randomly generated numbers between −1 and 1 will be approximately zero. Upon normalizing the displacement field (to a norm of 1), the field will be locally correlated (e.g., direction of displacement of a particular pixel is similar to direction(s) of displacement of surrounding pixel(s)). In an instance or is chosen sufficiently small, the displacement field will appear completely random upon normalization. Intermediate values of a thus can be utilized to facilitate simulating variation(s) of handwriting, speech, drawing, etc. that naturally occur during such human activity. The displacement field is locally correlated, thereby causing the field to move slowly and smoothly.

In accordance with one aspect of the present invention, a locally correlated field can also be obtained via generating a random displacement field at low resolution, and thereafter over-sampling and interpolating it to obtain a random displacement field at a resolution substantially similar to resolution of an image.

In accordance with another aspect of the invention, smooth displacement fields can be generated from a smooth function relating to particular position(s) of pixel(s) of an image. For example, a low order polynomial can be utilized as a smooth function via changing its coefficients. The coefficients can be a function of a random number generator. Note that if the polynomial is constant with respect to pixel position, the displacement corresponds to a global translation. If the polynomial is of degree one (e.g., a linear function of the position) the set of displacements is the set of linear transformation of coordinates, which include scaling, rotation, and sheer. If the degree is higher, the displacement field can change direction as many times as the order of the polynomial minus one. While low-pass filters and polynomials have been illustrated as exemplary methods for generating smooth displacement fields, it is to be understood that any suitable smooth displacement field can be employed in connection with the present invention, and is intended to fall within the scope of the hereto-appended claims.

In accordance with another aspect of the present invention, in an instance that convolution is utilized to generate a smooth displacement field, a random displacement field is first convolved with respect to x and thereafter convolved with respect to y, thus reducing computing resources utilized to generate the displacement field. Moreover, convolving randomly generated pixel displacements with a Gaussian is not required for the present invention to create elastic distortions. For example, the point displacements can be convolved with a square shape, triangular shape, or any other suitable shape that can be utilized in connection with filtering high-frequency displacements. Convolution shapes other than a Gaussian can be desirable to further save computing resources.

After a smooth displacement field has been generated, the displacement field can be further displaced via multiplying displacement(s) by a scalar value, resulting in further elastic distortion of the initial image. The amount of distortion can thus be controlled via generating random displacement values between pre-defined numbers, filtering high-frequency displacement(s) by utilizing polynomials, convolution, etc., and multiplying resultant displacement by a scalar. For example, choosing an appropriate value of σ when convolving the displacement field with a Gaussian is one parameter that can facilitate desirable distortion of the image. A scalar value α can also be selected to further elastically distort the image. The values σ and α can be determined from empirical data, user-selected, or selected via artificial intelligence techniques based at least in part upon user state and context.

Pixel position(s) generated upon smoothing the displacement field can be unavailable (e.g., displaced point(s) of an image can lie between four available pixel locations). The expansion component 102 in connection with the distortion algorithms 104 can facilitate interpolating the displaced point(s) of an image to compute appropriate pixel(s) for such points. Moreover, an appropriate color level for each pixel defining an image can be computed utilizing interpolation techniques. In accordance with one aspect of the present invention, bi-linear interpolation techniques are utilized to facilitate appropriately computing pixel(s) for displaced point(s) and color levels for such pixels, thus generating a smooth distorted image. However, it is to be understood that any interpolation technique has been contemplated and is intended to fall within the scope of the hereto-appended claims.

While two-dimensional elastic distortions can be useful for generating labeled data, several limitations exist which can be alleviated via one-dimensional elastic distortion (e.g., distorting a trajectory defined by functions of x(t) and y(t) by smoothing displacement distortions dx(t) and dy(t) with respect to time). For example, two-dimensional elastic distortions cannot distort a position in which lines cross in a character. One-dimensional elastic distortion can be applied in instances that an image can be described with respect to time. For example, when data is collected from an electronic pen and a pressure-sensitive screen, such as in a PDA or portable computer with a pressure-sensitive screen, the pen trajectory can be described by a position which is a function of time (e.g. by x(t) and y(t)) where t represent a time index. While the aforementioned example relates to data entered via a pressure-sensitive screen, it is to be understood that data not initially described with respect to time can be associated with time value(s) according to known writing, drawing, and/or speaking techniques. Such association of time and position enables creation of two functions defining a trajectory, x(t) and y(t). Displacement distortion dx(t) and dy(t) can be smoothed with respect to time and added to the functions x(t) and y(t) to elastically distort the image.

Displacement distortions dx(t) and dy(t) relating to the functions x(t) and y(t), which define a particular trajectory, can be generated utilizing a random number generator. For example, a random number generator can generate dx(t) and dy(t) via outputting values between two predefined numbers (e.g., negative one and one). A smoothing function can thereafter be applied to dx(t) and dy(t) with respect to time, thus locally correlating such equations (e.g., directions of the displacement from neighboring locations are similar). In accordance with one aspect of the present invention, a low-pass filter (e.g., convolution, polynomials, . . . ) can be utilized to filter high-frequency displacements, resulting in local correlation of dx(t) and dy(t). However, it is to be understood that any smooth displacement of dx(t) and dy(t) with respect to time is contemplated by the present invention. The displacement distortions dx(t) and dy(t) can then be multiplied by a scalar value, resulting in further elastic distortion of such displacement distortions. The displacement distortions dx(t) and dy(t) can thereafter be added to the functions x(t) and y(t) defining the trajectory, thereby elastically distorting the trajectory. Such one-dimensional elastic distortions enable generation of significantly more labeled data.

The generated labeled training data is thereafter delivered to a classifier 106 for training such classifier. The generated data can also be retained by the expansion component 102 to facilitate creation of more labeled data based upon the generated labeled data. The classifier 106 can include a training component 108 that utilizes the original labeled training data and elastically distorted labeled training data to effectively train the classifier 106. The classifier 106 can thereafter be employed to recognize and/or analyze handwriting, spoken words, speaker(s) of spoken words, objects such as fingerprints, etc.

In accordance with one aspect of the present invention, the classifier 106 can be a neural network. For example, the neural network can be a fully connected network with two layers (e.g., a universal classifier). Alternatively, the neural network can be a convolutional neural network, which has empirically been found to be well suited for visual document analysis. Moreover, the neural network can comprise a plurality of disparate error functions, such as cross-entropy (CE) and mean squared error (MSE). Furthermore, the classifier 106 can be an expert system, a support vector machine, as well as all other suitable statistical systems and/or methods that can utilize the elastically distorted training data for handwriting, speech, and or object analysis and/or recognition.

Figure 2:
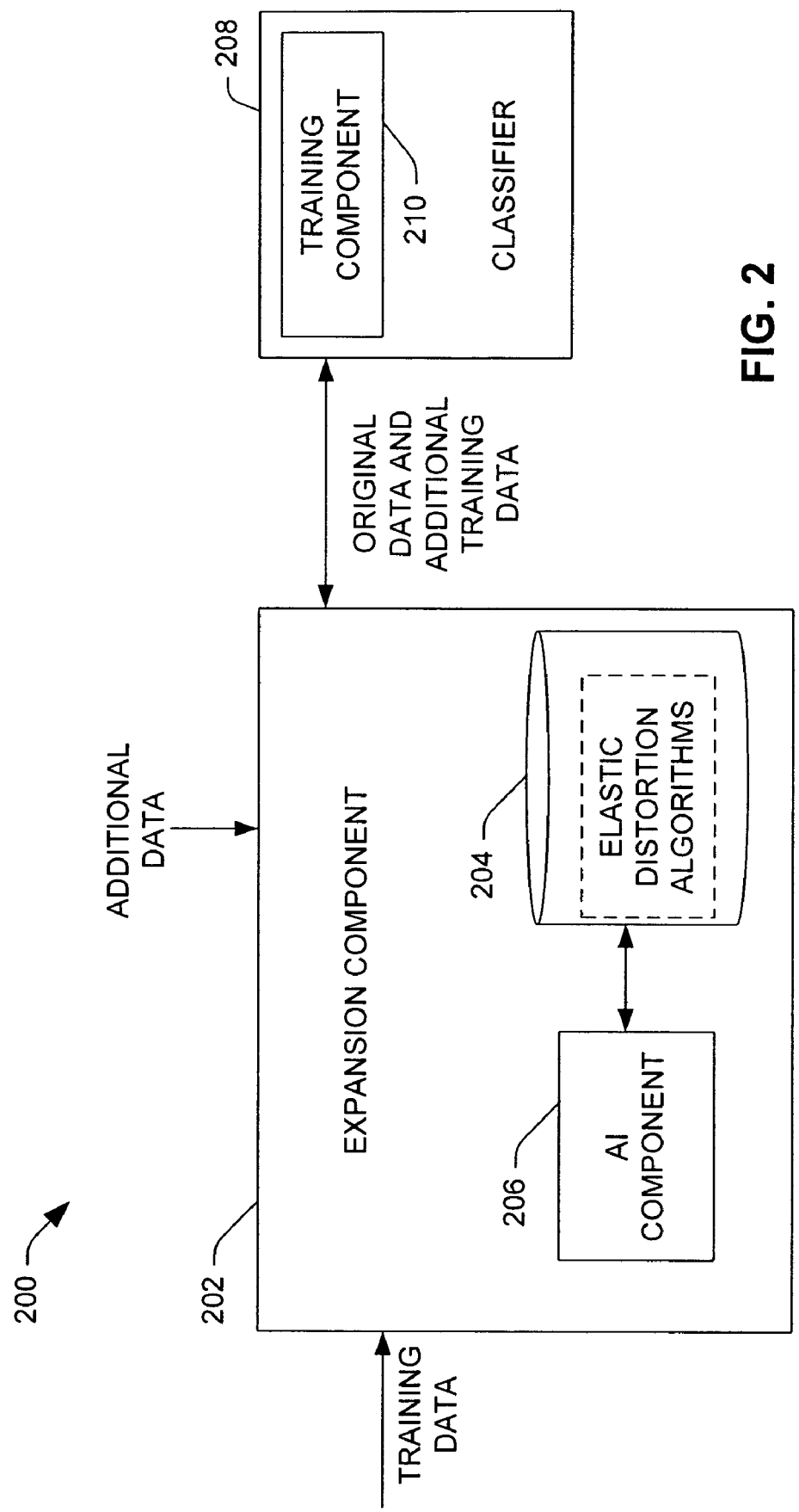
FIG. 2 is a block diagram of a system that facilitates generation of training data via elastic distortion in accordance with an aspect of the present invention.

Referring now to FIG. 2, a system 200 that facilitates generating labeled data utilized in connection with handwriting, speech, and/or object analysis is illustrated. The system 200 comprises an expansion component 202 that can generate a substantial amount of labeled data based upon initial training data, such as handwriting samples, digital images, voice recordings, etc. The initial labeled training data is elastically distorted via elastic distortion algorithms 204, which can utilize one-dimensional and/or two-dimensional distortion techniques to elastically distort the initial training data. One-dimensional distortion refers to generating a displacement distortions dx(t) and dy(t) for functions x(t) and y(t) that define a trajectory via employing a random number generator to output positive and negative values around a pre-defined displacement. A smoothing function can thereafter be applied to dx(t) and dy(t) with respect to time, thus enabling elastic distortion of the functions x(t) and y(t), and thus the trajectory defined by such functions. For example, a low-pass filter can be employed to smooth dx(t) and dy(t), and such displacement distortions can be added to x(t) and y(t). In accordance with one aspect of the present invention, a Gaussian of standard deviation σ can be utilized as a low-pass filter via convolving the Gaussian with the displacement distortions dx(t) and dy(t). Alternatively, the displacement distortions can be convolved with various other shapes. The resultant displacement distortions dx(t) and dy(t) can thereafter be multiplied by a scalar a to create a desirable displacement in time. The displacement distortions are then added to functions x(t) and y(t) that define a trajectory, thereby generating elastic distortions of such trajectory. Two-dimensional distortion refers to generating a displacement field within a two-dimensional image, wherein only a digital image is provided (e.g., the image cannot be defined by functions x(t) and y(t)). A random number generator is utilized to output random values corresponding to pixel coordinate(s) to generate a displacement field. The displacement field can thereafter be smoothed via a smoothing function, and the resultant displacement field can be multiplied by a scalar to obtain desirable elastic distortion. The displacement field can then be applied to an image, thus elastically distorting the image. The image can be interpolated to facilitate optimal display of the distorted image.

An artificial intelligence component 206 can be employed to infer parameters that facilitate optimal generation of labeled training data given user state and context as well as computing state and context. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

For example, the artificial intelligence component 206 can infer desirable low-pass filter type (e.g., polynomials, convolution, . . . ), value of σ when a Gaussian is employed as a low-pass filter, value σ of a scalar that is multiplied to a displacement field, etc. The artificial intelligence component 206 can receive information regarding current user, user state, computing tasks, computing capabilities, input data, current capabilities of a classifier, etc., and utilize such information to determine amount of elastic distortion to apply in a one-dimensional and/or two-dimensional distortion context, amount of labeled training data to generate, invariance of the training data, etc. Thus the artificial intelligence component 206 can facilitate optimal generation of labeled data given information relating to a user and/or computer.

A classifier 208 associated with a training component 210 receives the labeled data generated by the expansion component 202. The generated labeled data can further be utilized by the expansion component 202 to generate additional labeled data (e.g., the generated labeled data can be input to the expansion component 202 and thereafter elastically distorted). The training component 210 utilizes the generated labeled data and the original training data to facilitate recognition and/or analysis of handwriting, speech, and/or objects via the classifier 208. Furthermore, the classifier 208 can infer invariance of the initial training data, thus facilitating handwriting, speech, and/or object recognition and/or analysis.

Figure 3:
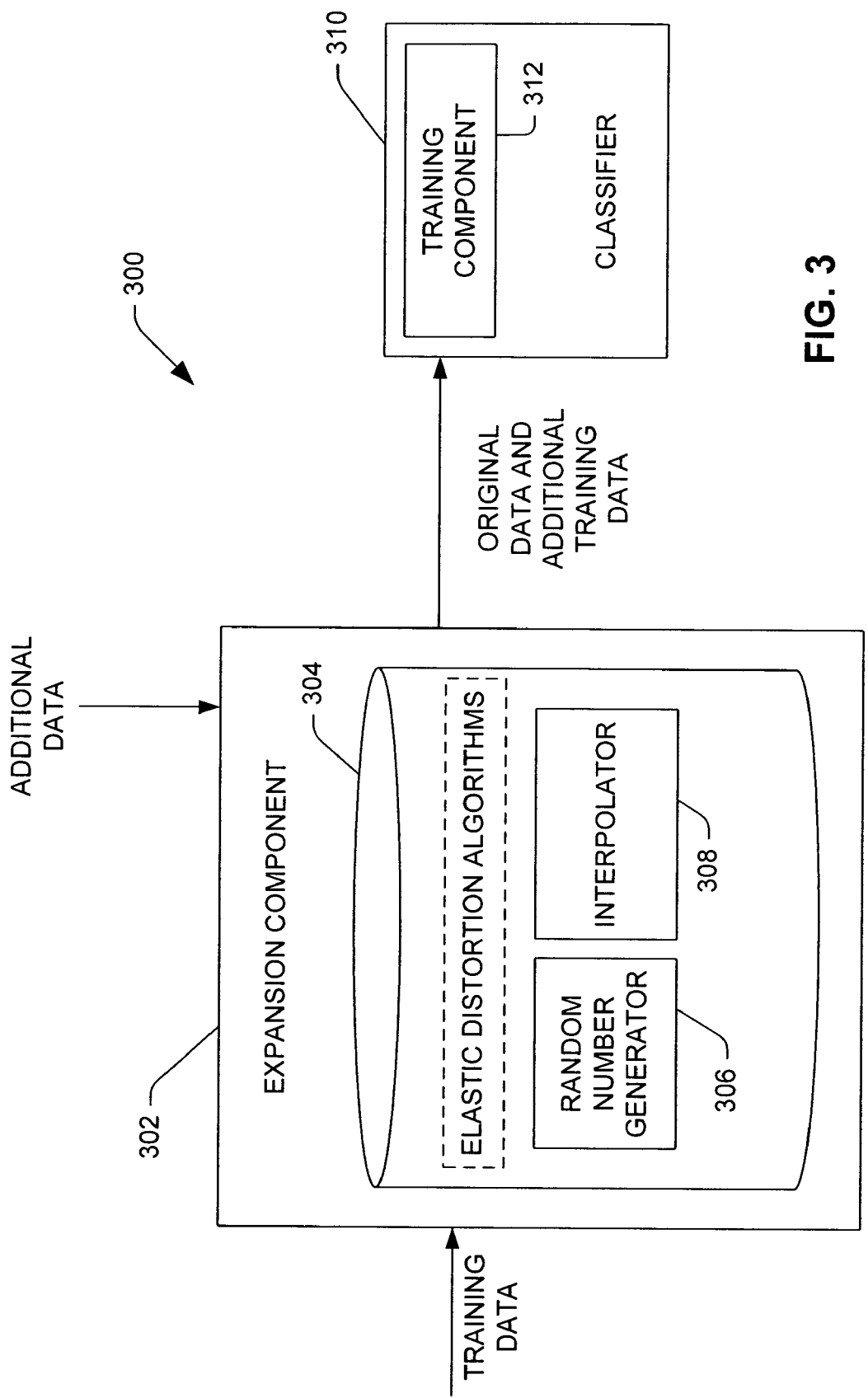
FIG. 3 is a block diagram of a system that facilitates generation of training data via elastic distortion in accordance with an aspect of the present invention.

Turning now to FIG. 3, an exemplary system 300 that facilitates generating a substantial amount of labeled training data from an initial set of labeled data is illustrated. The system 300 includes an expansion component 302 that receives a set of labeled training data. The expansion component 302 facilitates generating additional labeled training data via elastic distortion algorithms 304 that effectuate elastically distorting the initial set of labeled training data. Elastically distorting the initial set of labeled training data can occur through generating and smoothing a random displacement field. The elastic distortion algorithms 304 can employ a random number generator 306 to randomly displace pixel(s) defining an image representative of handwriting, speech, and/or object(s). The random number generator 306 can output values between two predefined numbers (e.g., negative one and one) for pixel(s) of an image, and the pixel(s) can be displaced according to such output values. In 2-dimensional elastic distortion, for example, if $\Delta x(x,y)=0.75$, and $\Delta y(x,y)=-0.5$, a target location for a pixel will be displaced by 0.75 in an x-direction and −0.5 in a y-direction, thereby creating a 2-dimensional displacement field. Alternatively, the random number generator 306 can be employed to output random values utilized to displace time when coordinate(s) of pixel(s) are associated with time value(s).

Upon generating a random displacement field and/or displacement distortions dx(t) and dy(t), the elastic distortion algorithms 304 can effectuate smoothing the displacement field via utilizing a smoothing function, such as a low-pass filter. In accordance with one aspect of the present invention, the random displacement field is convolved with a Gaussian of standard deviation σ selected to smooth the displacement field in a manner representative of variation that can be observed in human action during writing, speaking, drawing, etc. Alternatively, the displacement field can be smoothed via a polynomial, convolution of any suitable shape, or any other suitable smoothing function. The resultant displacement field can thereafter be multiplied by a scalar to facilitate generating elastic distortions of desirable magnitude.

Utilizing a randomly generated displacement field can result in image point(s) that are not available within a computer due to a discrete nature of pixels. The expansion component 302 can include an interpolator 308 that selects a most appropriate available pixel for point(s) of the image based at least in part upon original pixel coordinate(s). For example, an image point can be desirably displaced to a location between four available pixels. The interpolator 308 can thereafter compute an appropriate pixel for each displaced point. In accordance with one aspect of the present invention, the interpolator utilizes bi-linear interpolation to compute appropriate pixel(s) for displaced image point(s). Upon interpolating displaced point(s), an elastically distorted image based upon the initial image is created and relayed, along with the initial image, to a classifier 310. A training component 312 is associated with the classifier 310, and utilizes the initial image and the elastically distorted image to train the classifier 310 for recognizing and/or analyzing images associated with handwriting, speech, and/or objects.

Figure 4:
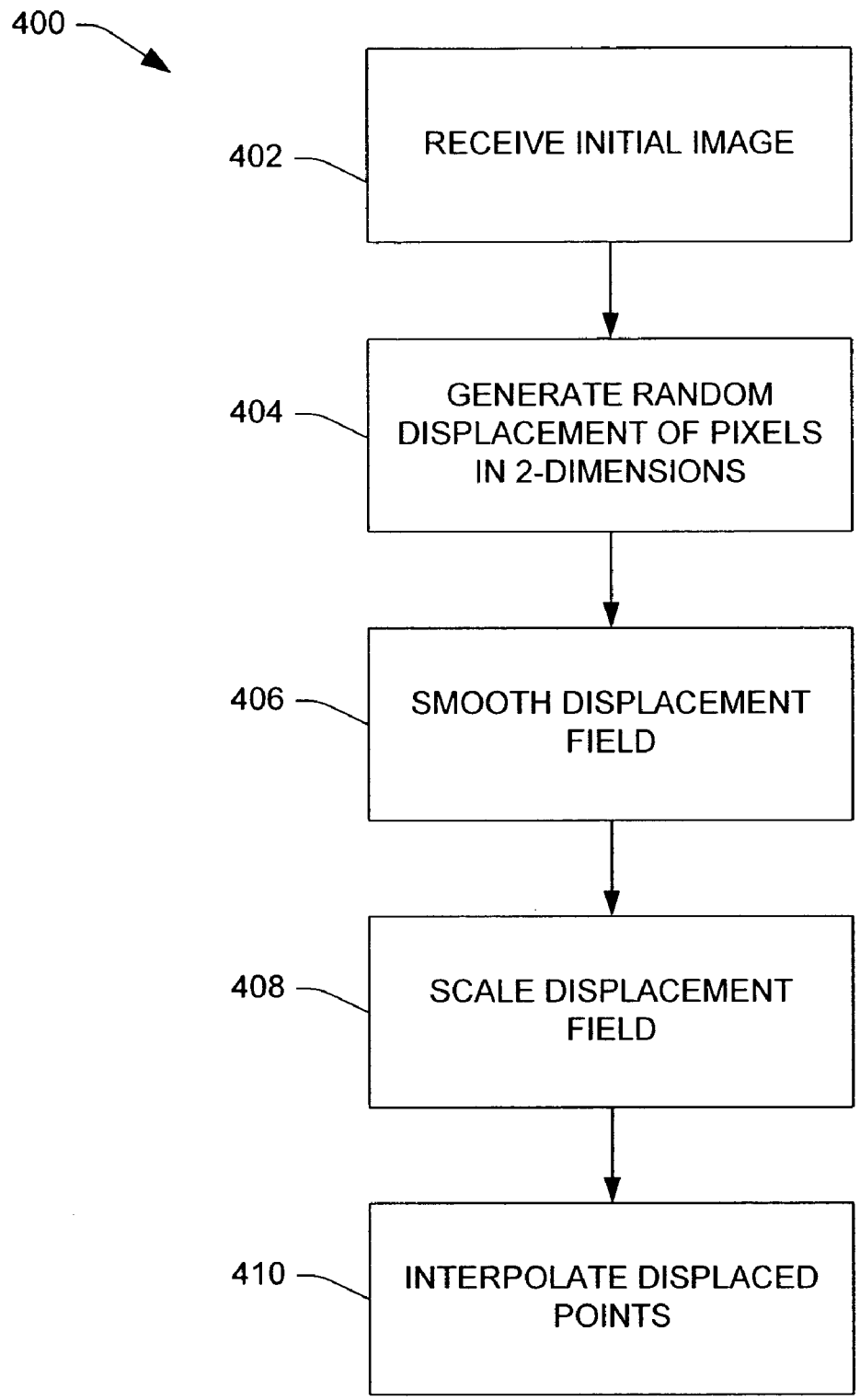
FIG. 4 is a representative flow diagram illustrating elastically distorting labeled training data in two-dimensions in accordance with an aspect of the present invention.

Turning now to FIG. 4, a methodology 400 for generating training data via elastically distorting an image in 2-dimensions is illustrated. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 402, an initial labeled image (e.g., a computer is informed that the image represents a particular character, object, word, speaker, . . . ) is received. The image can represent a character (e.g., a letter, number, symbol, . . . ), a written word, a spoken word or series of spoken words, a sound, an object, or any other suitable entity that can be represented via an image. At 404, pixel(s) defining the image are randomly displaced in 2-dimensions, thereby creating a displacement field. For example, a random number generator can output values that are utilized to displace pixel(s) relative to their location in the received image. In a more particular example, the random number generator can output values around a zero trajectory for each coordinate that defines location of pixel(s) within the initial image. For instance, the random number generator can output values −0.5 and 0.75 to be applied to a pixel defined by coordinates (2, 2) in the initial image. Therefore $\Delta x=-0.5$ and $\Delta y=0.75$, thus displacing the pixel to a new location (1.5, 2.75). In accordance with one aspect of the present invention, each pixel defining the initial image can be randomly displaced in all dimensions of the initial image.

At 406 a smoothing function is applied to the displaced pixels to facilitate smoothing the displacement field. In accordance with one aspect of the present invention, a Gaussian with an appropriate σ can be convolved with the displacement field to smooth such displacement field. An appropriate value for σ can be determined empirically and defined by a user, determined via artificial intelligence techniques, or otherwise. Alternatively, other shapes (e.g., a square) can be utilized in connection with convolving the displacement field to facilitate smoothing such displacement field. Moreover, other smoothing techniques, such as a polynomial employed as a low-pass filter, are contemplated by the present invention. In accordance with another aspect of the present invention, if convolution techniques are utilized to smooth the displacement field, such displacement field can be convolved one dimension at a time to conserve computing resources. Appropriately smoothing the displacement field results in a locally correlated displacement field which simulates various human activity (e.g., motion of hands, inflection of voice, . . . ).

At 408 the smoothed displacement field is multiplied by a scalar of value α, thus scaling the displacement field. Such a scalar can be chosen to simulate elasticity that occurs in handwriting, speech, drawing, and various other human activities. The value of α can be user-defined based on empirical data, determined via artificial intelligence techniques, or otherwise. Point(s) defining the image after displacement can be located at a position not contemplated due to a discrete nature of pixel(s). For example, a displaced point can have a desirable position that lies between four available pixels. Thus at 410 the displaced pixels are interpolated to facilitate generation of an elastically distorted image that can be utilized in connection with training a classifier. In accordance with one aspect of the present invention, bilinear interpolation can be employed to compute appropriate pixel(s) to display point(s) defining an image. Elastically distorted images resulting from utilizing the methodology 400 can thereafter be employed as input images, and the methodology can be repeated starting at 404. Moreover, elastically distorted images can be relayed to a classifier to train such classifier regarding handwriting, speech, and/or object recognition and/or analysis.

Figure 5:
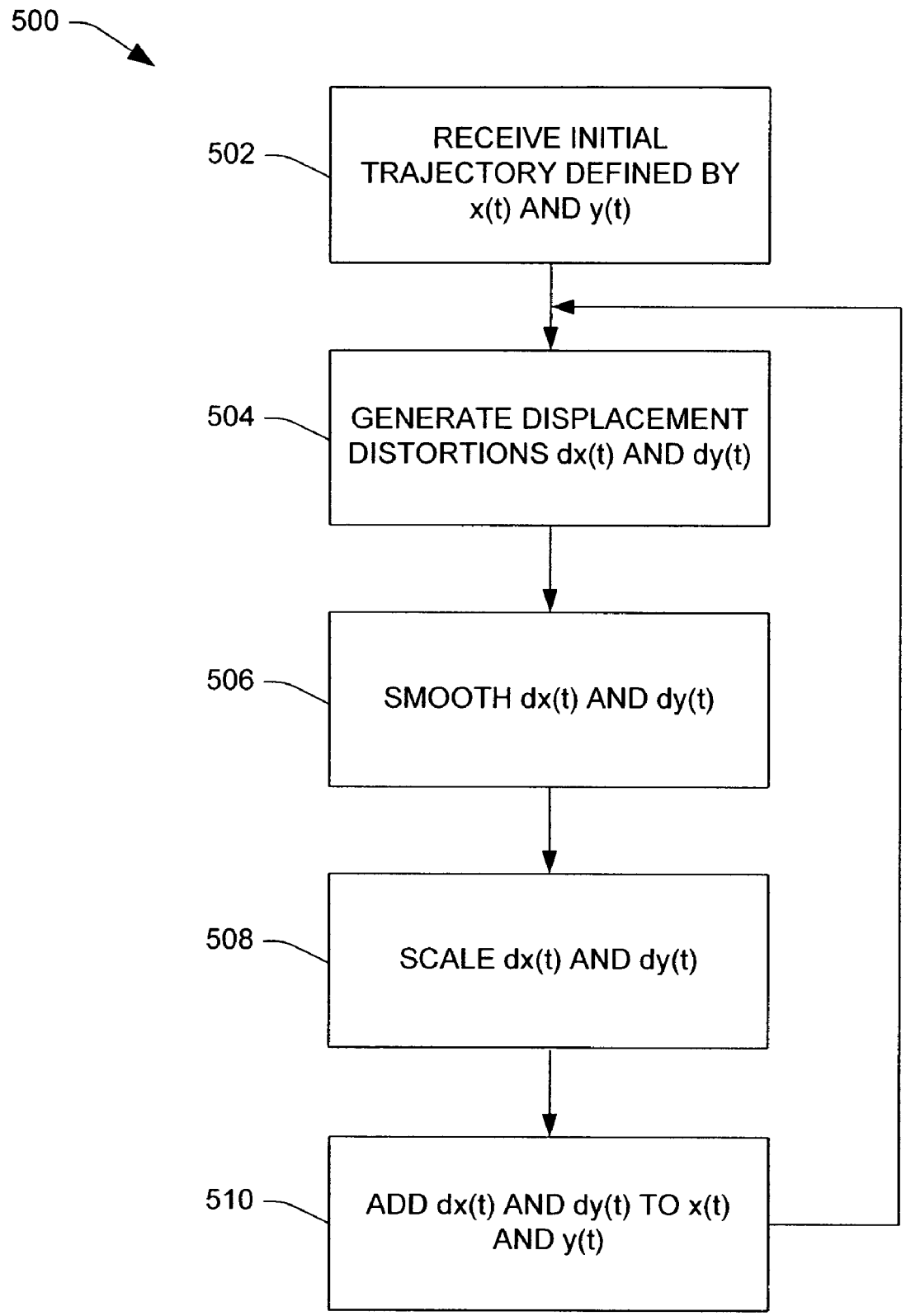
FIG. 5 is a representative flow diagram illustrating elastically distorting labeled training data in one-dimension in accordance with an aspect of the present invention.

Turning now to FIG. 5, a methodology 500 for generating labeled training data for a classifier via elastically distorting an image with respect to time is illustrated. At 502 a trajectory defined by functions x(t) and y(t) is received. For example, a portable computing device (e.g., tablet computer, personal data assistant, wireless telephone, . . . ) can time-sample a handwritten character and/or word that is being entered via a pressure-sensitive screen (e.g., the portable computing device can associate pixel coordinate(s) defining the character and/or word with time as the character is entered). Alternatively, an image that does not comprise time-related data can be assigned disparate time value(s) for pixel(s) defining the image. For instance, a computer can assign time values to pixel(s) defining a labeled image (e.g., labeled data) based at least in part upon known writing techniques. Therefore, a received image in two-dimensions will comprise a tuple of data for a pixel of the form (x, y, t), wherein "x" defines a coordinate of the pixel in a x-direction, "y" defines a coordinate of the pixel the y-direction, and "t" represents a particular time associated with the pixel location. Data organized in such a manner enables an image to be viewed as a trajectory defined by the equations x(t) and y(t).

At 504, displacement distortions dx(t) and dy(t) are generated by a random number generator, which generates positive and negative value(s) to be added to the function x(t) and y(t). In accordance with one aspect of the present invention, the random number generator can be employed to output random values around a pre-defined number. For example, the random number generator can output values around a zero displacement for point(s) defining a trajectory, and initial time values associated with the trajectory can be modified by such output values relative to the initial time values. More specifically, in an instance that x(t)=1 at time t=4 and dx(t)=0.25 at time t=4, the displaced x(t) value at time t=4 would be 1.25.

At 506, a smoothing function is applied to the displacement distortions dx(t) and dy(t) with respect to time, thereby rendering such distortions locally correlated. In accordance with one aspect of the present invention, convolution can be utilized to smooth the distortions dx(t) and dy(t) with respect to time. For example, the distortions can be convolved with a Gaussian of appropriate standard deviation σ, thereby filtering high-frequency displacements. However, it is to be understood that any smoothing function is contemplated by the present invention.

At 508 the resultant displacement distortions dx(t) and dy(t) can be multiplied by a scalar, thereby scaling such distortions to result in desirable elastic deformation of the functions x(t) and y(t), and thus the trajectory. Such a scalar can be chosen to simulate elasticity that occurs in handwriting, speech, drawing, and various other human activities. The value of a can be user-defined based on empirical data, determined via artificial intelligence techniques, or otherwise. The trajectory can thereafter be re-generated based upon the displacement distortions dx(t) and dy(t) via adding such distortions to x(t) and y(t). Upon re-generation, point(s) defining the trajectory can be located at position(s) not available due to a discrete nature of pixels. At 510 the displacement trajectories dx(t) and dy(t) after smoothing and scaling are added respectively to x(t) and y(t) to yield the elastically deformed trajectories. One-dimensional distortion facilitated by the methodology 500 enables generation of an abundance of data that can be utilized in connection with training a classifier employed to recognize and/or analyze handwriting, speech, objects, etc.

Figure 6:
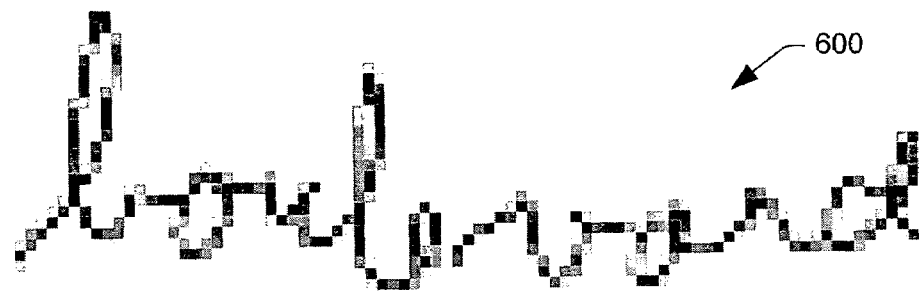
FIG. 6 illustrates an exemplary trajectory in accordance with an aspect of the present invention.
Figure 7:
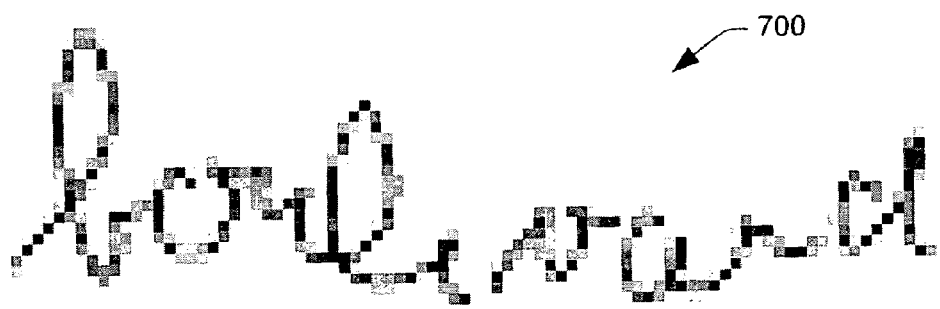
FIGS. 7 and 8 illustrate exemplary one-dimensional elastic distortions in accordance with an aspect of the present invention.
Figure 8:
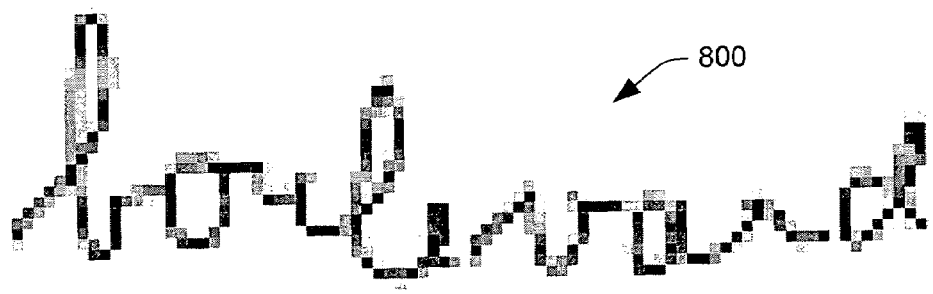

Regarding FIGS. 6-8, the word "boulevard" 600 has time values associated with pixel location (e.g., the word 600 has been collected from a pressure-sensitive screen), and rendered as a digital image. One dimensional elastic distortions have been added to original trajectories x(t) and y(t) that define the image, and then rendered as digital images to generate elastic distortions 700 (FIG. 7) and 800 (FIG. 8). It can be noted that the "e" in "boulevard" has been opened in image 700 while the "l" in "boulevard" has been almost closed. The loop in the "b" and the "l" also looks quite different in images 600, 700, and 800. Also the "o" and the "d" have been opened in image 800. These distortions are possible because trajectories x(t) and y(t) are available. If trajectories were not existent (e.g., no time values were available), elastic two-dimensional distortion could not have change the nature of the letters as illustrated.

Figure 9:
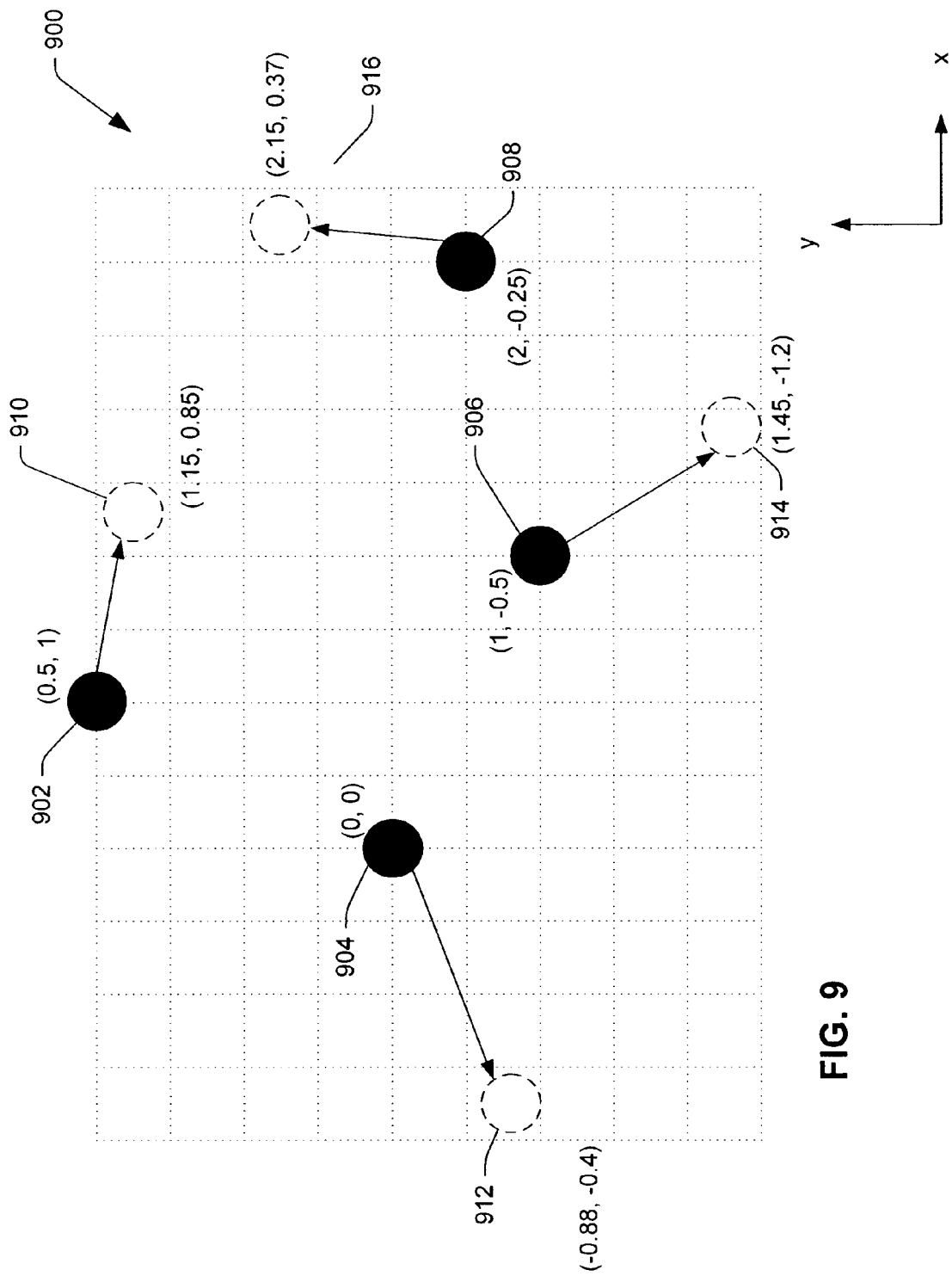
FIG. 9 is an exemplary arrangement of pixels that are randomly displaced in accordance with an aspect of the present invention.
Figure 10:
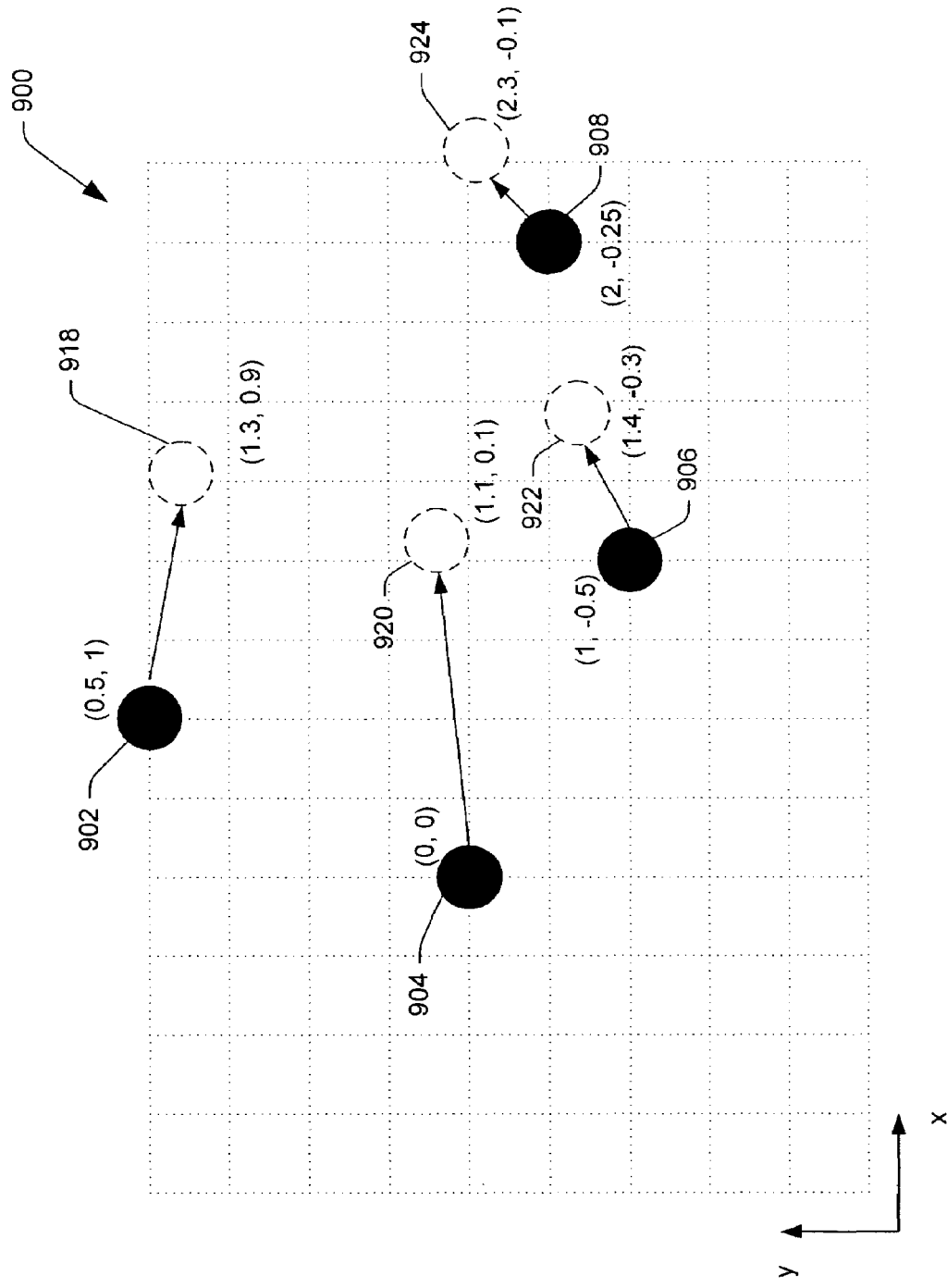
FIG. 10 is an exemplary arrangement of pixels after random displacements have been filtered in accordance with an aspect of the present invention.
Figure 11:
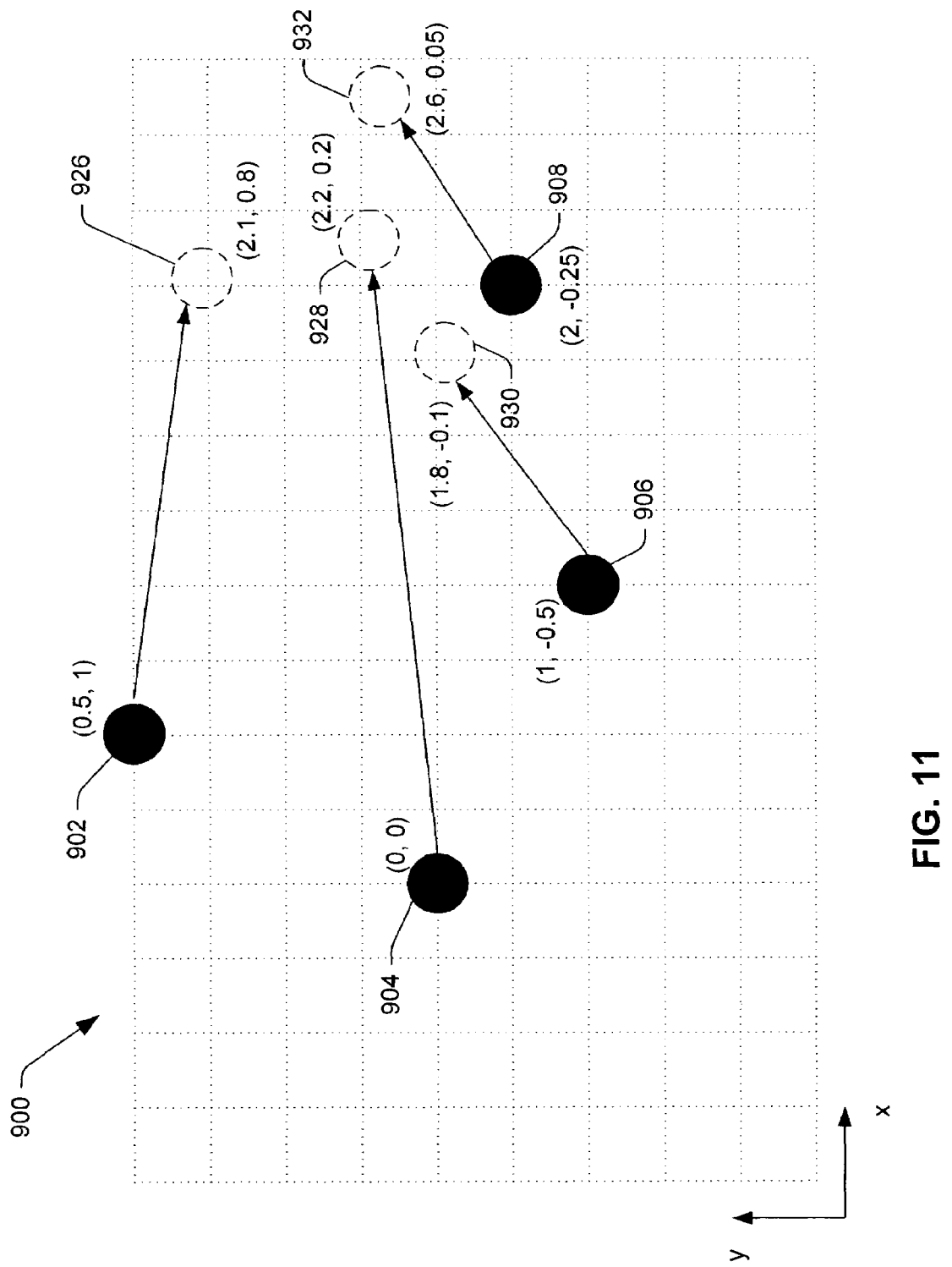
FIG. 11 is an exemplary arrangement of pixels after filtered displacements have been scaled in accordance with an aspect of the present invention.

Now regarding FIGS. 9-11, an exemplary displacement field 900 of randomly displaced pixels is illustrated. Referring specifically to FIG. 9, an image is defined at least in part by pixels 902, 904, 906, and 908, which are located at coordinates (0.5, 1), (0, 0), (1, −0.05), and (2, −0.25) respectively, wherein the coordinates map to available pixel locations on a pixel grid (e.g., intersections of the grid indicate available pixel locations). A random number generator (not shown) can be employed to output random values around zero (e.g., between −1 and 1), thus traversing the pixels 902, 904, 906, and 908 randomly relative to their initial position. Referring specifically to pixel 902, for example, the random number generator can output values for each dimension defining location of the pixel 902. In particular, the random number generator can output values 0.65 and −0.15, thus desirably displacing the pixel 902 to a new pixel location 910 defined by coordinates (1.15, 0.85). The random number generator can similarly output values for the pixels 904, 906, and 908 to displace such pixels to new positions 912, 914, and 916, respectively. The new pixel locations 912-916 can be defined by coordinates (−0.88, −0.4), (1.45, −1.2), and (2.15, 0.37). Thus, the displacement field 900 illustrates pixels 902-908 displaced randomly in two dimensions.

Turning now to FIG. 10, the displacement field 900 after a smoothing function has been applied is illustrated. Application of such smoothing function results in a smooth displacement of pixels 902-908 to create a locally correlated displacement field. In accordance with one aspect of the present invention, the displacement field 900 can be convolved with a Gaussian of appropriate standard deviation σ, thereby smoothing the displacement field 900. Smoothing the displacement field 900 results in the pixels 902-908 displaced to positions 918-924 respectively. In the exemplary displacement field 900, the positions 918-924 can be defined by coordinates (1.3, 0.9), (1.1, 0.1), (1.4, −0.3), and (2.3, −0.1) respectively.

Referring now to FIG. 11, the displacement field 900 upon multiplying such displacement field 900 by a scalar is illustrated. Choosing an appropriate value for the scalar enables imitation of distortion that occurs in human activity, such as handwriting, speech, drawing, etc. The desired displacement of the pixels 902-908 is multiplied by the scalar value, resulting in further distortion of the image. For example, as illustrated in FIG. 10, the pixel 902 is desirably displaced by 0.8 in the x-direction and −0.1 in the y-direction to new position 918. Returning to FIG. 11, if the scalar value is 2, pixel 902 will be displaced by 1.6 in the x-direction and −0.2 in the y-direction, resulting in a new position 926 with coordinates (2.1, 0.8). The displacement of pixels 904-908 will be similarly scaled, resulting in new pixel locations 928-932 with coordinates (2.2, 0.2), (1.8, −0.1), and (2.6, 0.05) respectively.

Now referring to FIG. 12, an exemplary interpolation 1200 of a point 1202 of an elastically distorted image is illustrated. Due to a discrete nature of pixels, a desirable location (and color level) corresponding to a displaced point of an elastically distorted image may not be available. Thus for a distorted image to be generated, points(s) defining the image can be interpolated (e.g., point(s) can be assigned to optimal pixels). In accordance with one aspect of the present invention, bi-linear interpolation techniques are utilized to interpolate point(s) defining an elastically distorted image. In the exemplary interpolation of FIG. 12, the point 1202 has coordinates of (0,0), and available pixels 1204-1210 having values of 3, 5, 7, and 12, and at locations (1, 0), (2, 0), (1, −1) and (2, 1) respectively. The point 1202 is desirably displaced to location (1.75, −0.5) as displayed by displaced point location 1212. The color value for point 1202 at the displaced pixel location 1212 can be computed by evaluating the color value at location (1.75, −0.5) from the initial point location (0,0). Bilinear interpolation can be utilized to interpolate the point horizontally and then interpolate the point vertically. While bilinear interpolation is described as a means for interpolating point(s), it is to be understood that various other interpolation methods, such as bicubic and spline interpolation, are contemplated by the present invention.

The displaced point location 1212 is first interpolated horizontally via computing the coordinates of the displaced point location 1212 with respect to its location between available pixels 1204-1210. For example, the displaced point location lies between pixels 1204-1210. If pixel 1206 is assumed to be at (0, 0), then the displaced point location 1212 lies at (0.75, 0.5) with respect to such pixel 1206. The horizontal value can then be interpolated based on the values of pixels 1204-1210. In this example, the new horizontal values are: $3+0.75\times(7-3)=6$; and $5+0.75\times(9-5)=8$, displayed by interpolated values 1214 and 1216, respectively. Utilizing these values for vertical interpolation yields $8+0.5\times(6-8)=7$, which is the new pixel location (e.g., pixel 1208) and color value for point 1202. A similar computation can be done for all points(s) defining an image that has been distorted. Furthermore, pixel locations outside a given image are assumed to have a background value (e.g., 0).

Figure 13:
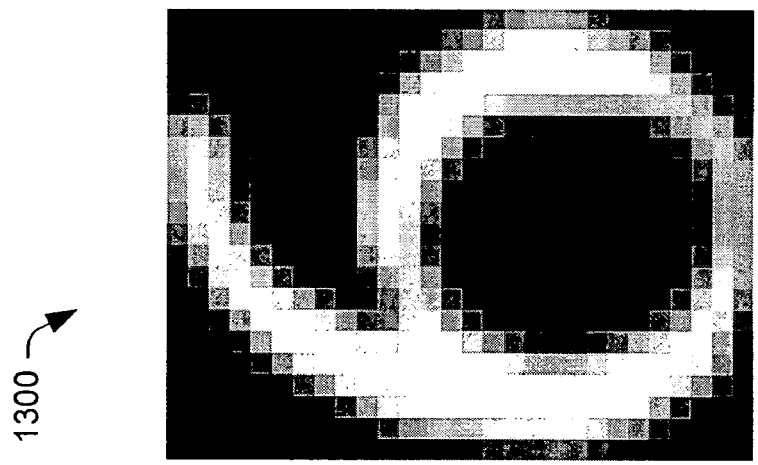
FIG. 13 is an exemplary labeled character that can be utilized to generate additional labeled data via elastic distortion in accordance with an aspect of the present invention.

Turning now to FIG. 13, an exemplary labeled character 1300 that can be utilized in connection with training a classifier is illustrated. The character 1300 can be input via a scanner, digital camera, downloaded from a server, or any other means for obtaining such character 1300. Alternatively, the character 1300 can be entered by a user via a pressure sensitive screen such as can be found on a portable computing device.

Figure 15:
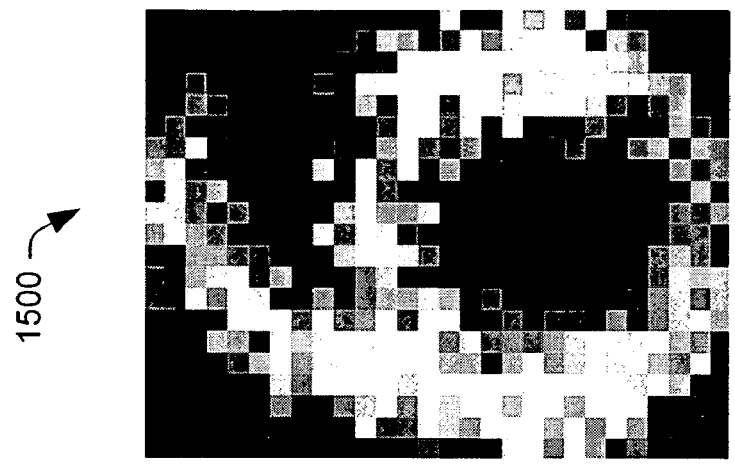
FIG. 15 illustrates a character generated upon applying a random displacement field in accordance with an aspect of the present invention.
Figure 14:
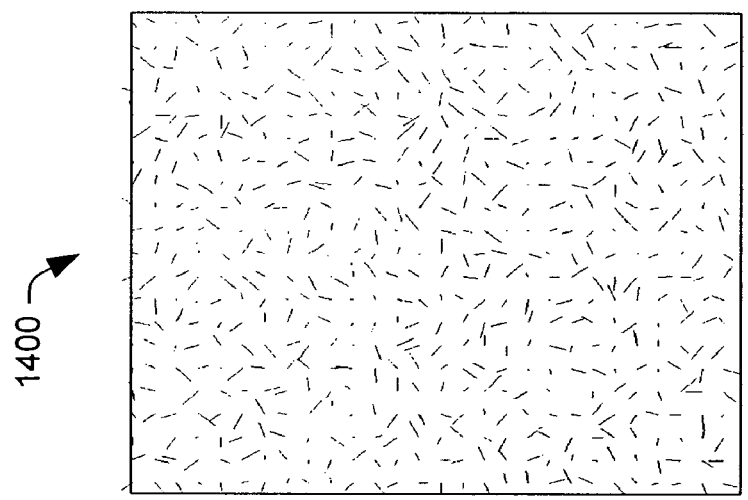
FIG. 14 is an exemplary random displacement field in accordance with an aspect of the present invention.

Now regarding FIG. 14, a random two-dimensional displacement field 1400 that can be applied to the character 1300 of FIG. 13 is illustrated. The displacement field 1400 comprises displacements of random values in random directions. Turning briefly to FIG. 15, a generated character 1500 is illustrated upon the character 1300 (FIG. 13) being displaced in two-dimensions via the displacement field 1400 (FIG. 14). As can be determined by examining the generated character 1500, such random displacement of pixels does not correlate to typical activity (e.g. writing) associated with humans. Therefore the generated character 1500 would not be useful in connection with training a classifier that facilitates analysis and/or recognition of handwriting.

Figure 17:
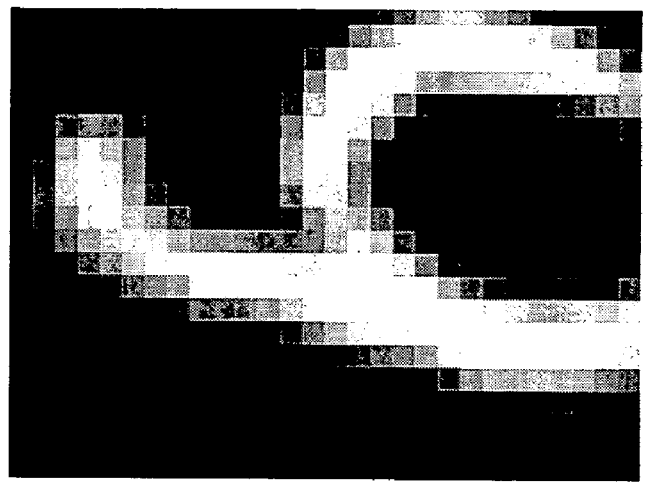
FIG. 17 illustrates a character generated upon applying a filtered displacement field in accordance with an aspect of the present invention.
Figure 16:
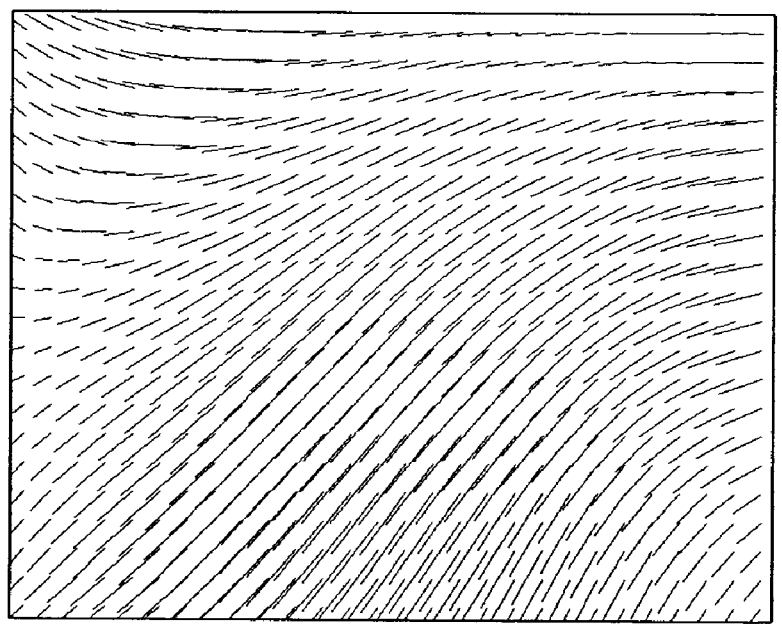
FIG. 16 is an exemplary random displacement field after such field has been convolved with a Gaussian in accordance with an aspect of the present invention.

Referring now to FIG. 16, an exemplary displacement field 1600 that can be applied to the character 1300 (FIG. 13) is illustrated. The displacement field 1600 has been filtered via a convolution with a Gaussian of standard deviation σ=8, thereby generating locally constant displacement with random direction. However, a similar displacement field can be obtained by filtering a purely random field with other low-pass filters. Turning now to FIG. 17, a character 1700 generated based upon the initial character 1300 (FIG. 13) and the displacement field 1600 (FIG. 16) is illustrated. Such generated character 1700 has been elastically distorted in two-dimensions and simulates randomness associated with human handwriting.

Figure 19:
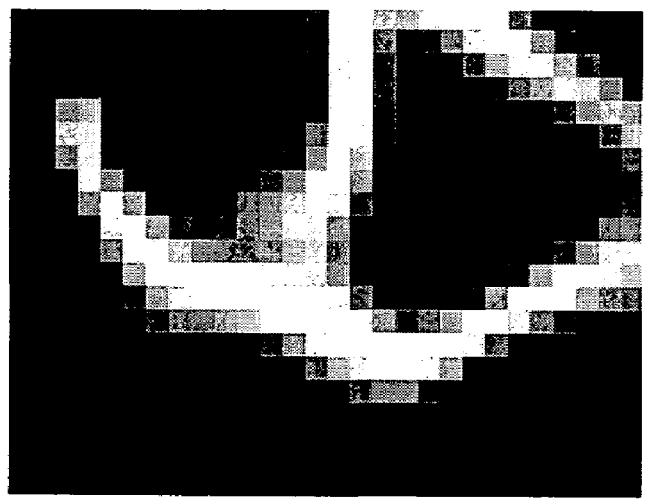
FIG. 19 illustrates a character generated upon applying a filtered displacement field in accordance with an aspect of the present invention.
Figure 18:
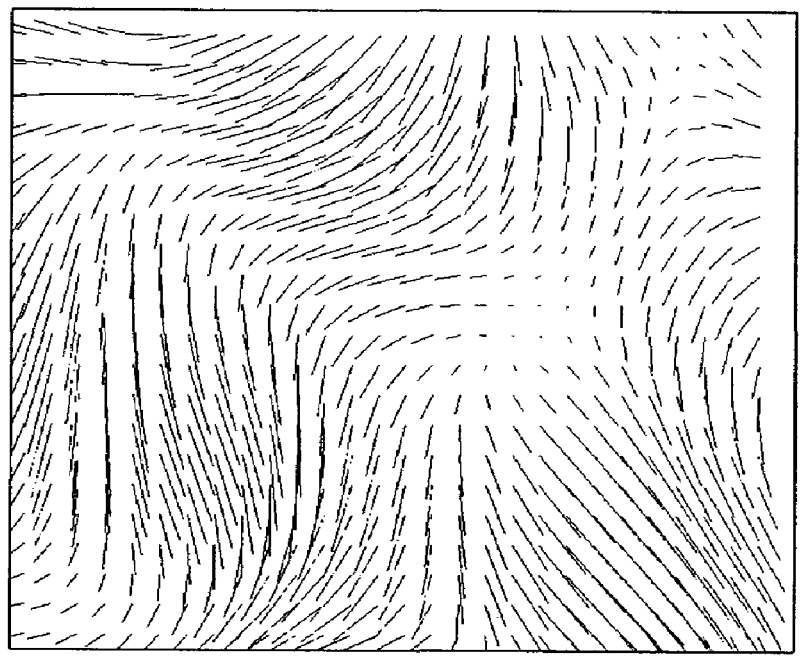
FIG. 18 illustrates an exemplary random displacement field after such field has been convolved with a Gaussian in accordance with an aspect of the present invention.

Now referring to FIG. 18, an exemplary displacement field 1800 that can be applied to the character 1300 (FIG. 13) is illustrated. The displacement field 1800 has been filtered via a convolution with a Gaussian of standard deviation σ=4, thereby generating a more random displacement field when compared to the displacement field 1600 (FIG. 16). Turning now to FIG. 19, a character 1900 generated based upon the initial character 1300 (FIG. 13) and the displacement field 1800 (FIG. 18) is illustrated. Because the standard deviation σ of the Gaussian utilized in convolution was chosen somewhat smaller, a higher level of randomness results in the displacement field 1700 (FIG. 17). A Gaussian of lower values can be utilized, for example, to train a classifier to recognize handwriting of an individual with Parkinson's Disease (e.g., such individual will have more random movements when writing as compared to an individual without Parkinson's Disease).

Figure 20:
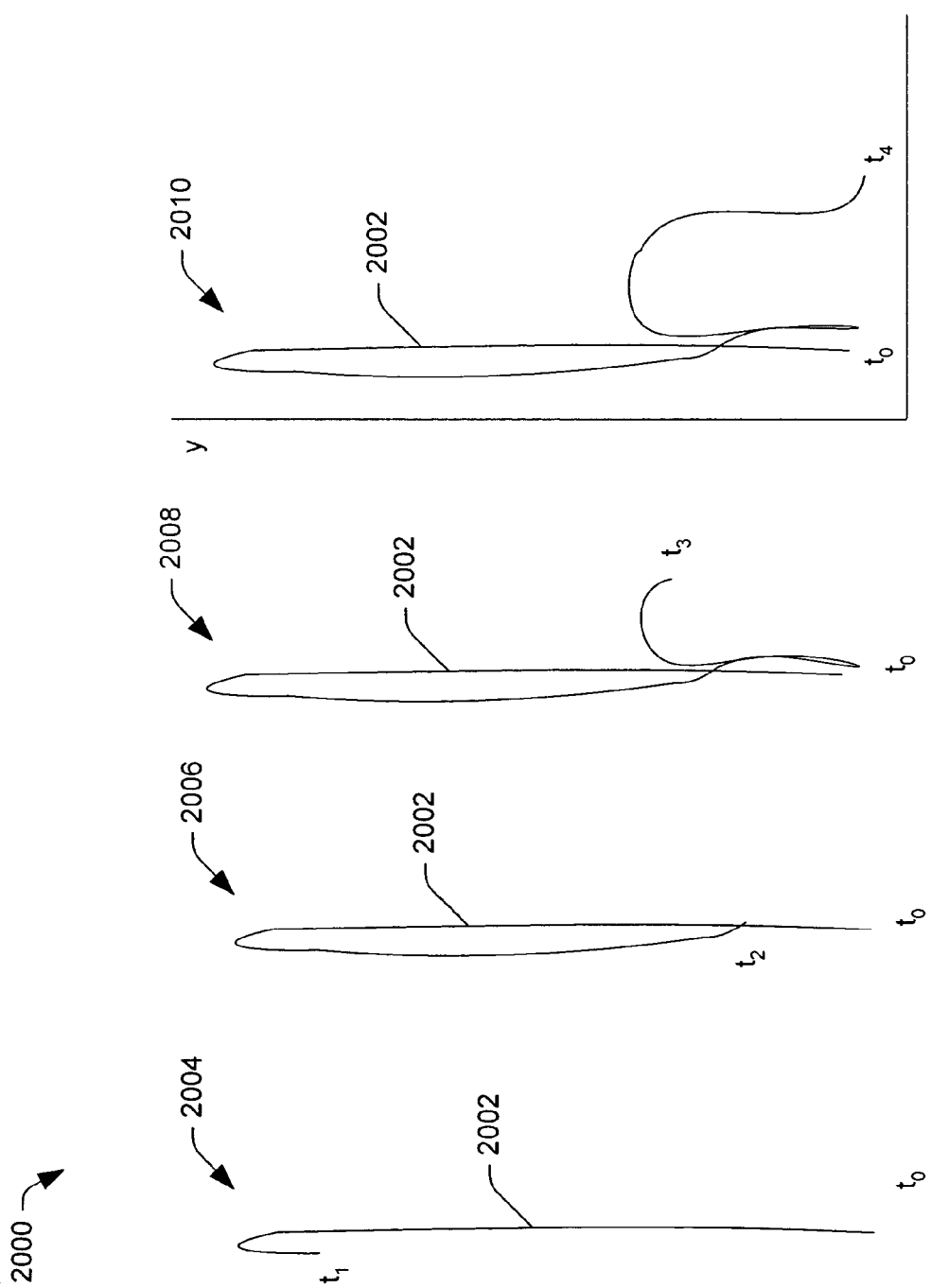
FIG. 20 illustrates an exemplary trajectory in accordance with an aspect of the present invention.

Now regarding FIG. 20, an exemplary sequence 2000 illustrating a typical manner of writing a character 2002 is displayed. At 2004 beginning at time $t_0$ a writing unit (e.g., pen, pencil, Tablet PC wand, . . . ) employed to create the character 2002 is directed vertically to a desirable position, and thereafter directed in an approximately opposite direction at time $t_1$. At 2006 the writing unit is directed to intersect a portion of a line that has previously been written at time $t_2$. Thereafter at 2008 the writing unit is again directed vertically and gradually directed horizontally until a local maximum is reached at $t_3$. At 2010 writing of the character 2002 is completed at time $t_4$. The sequence 2000 illustrates a manner in which functions x(t) and y(t) defining a trajectory can be generated. While the sequence 2000 displays only five disparate sampled times, it is to be understood that the functions x(t) and y(t) (themselves trajectories) defining the trajectory can contemplate numerous time values.

Figure 22:
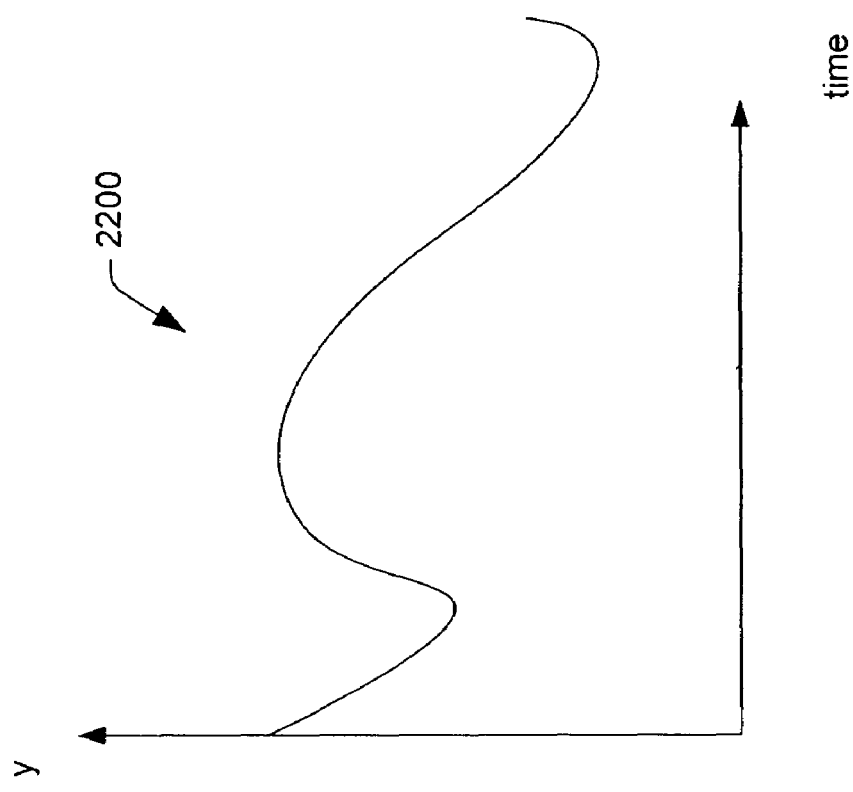
FIGS. 21 and 22 are exemplary graphs of functions of time x(t) and y(t) that represent a trajectory in accordance with an aspect of the present invention.
Figure 21:
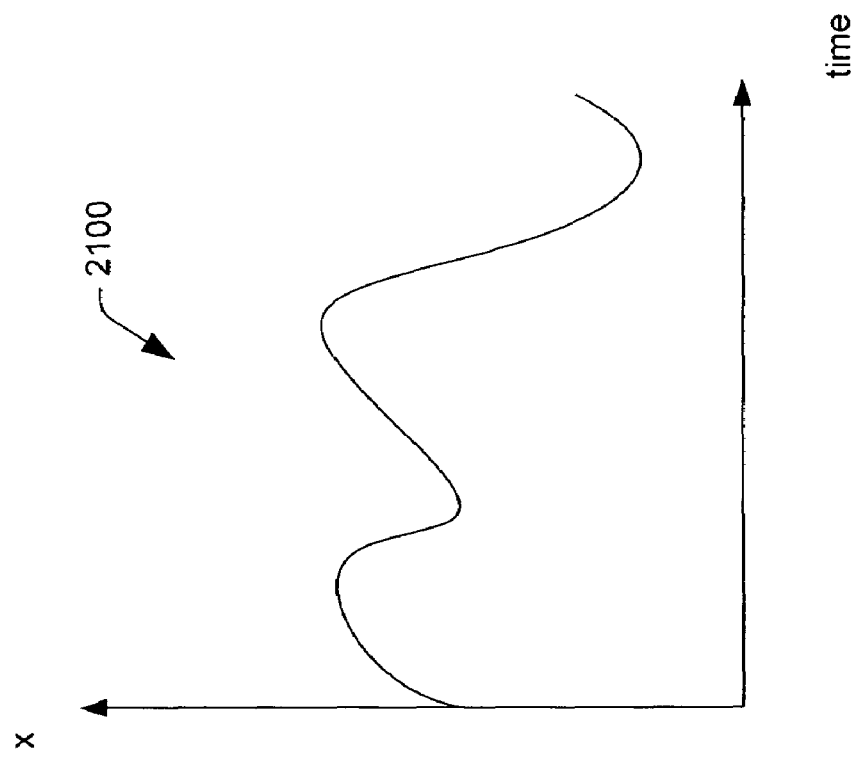

Turning now to FIGS. 21 and 22, graphs 2100 (FIG. 21) and 2200 (FIG. 22) of exemplary functions x(t) and y(t) that define a particular trajectory (e.g., the character 2002 illustrated in FIG. 20) are illustrated. The trajectory can be elastically distorted via generating displacement distortion dx(t) and dy(t) and adding such distortions to the functions x(t) and y(t). In accordance with one aspect of the present invention, a random number generator can be employed to generate the displacement distortions dx(t) and dy(t).

Now regarding FIG. 23, an exemplary function 2300 that can be utilized as dx(t) and/or dy(t) in accordance with the present invention is illustrated. The exemplary function 2300 represents random values corresponding to the functions x(t) 2100 and/or y(t) 2200, wherein such function 2300 can be added to the function(x) x(t) and/or y(t). In accordance with one aspect of the present invention, a random number generator can generate positive and negative values corresponding to values of the functions x(t) 2100 and/or y(t) 2200, and the function 2300 can be added to x(t) 2100 and y(t) 2200 accordingly. For example, at time t=4 a value for x(t) can be 3, and for the same time value t=4, a value of dx(t) can be −0.25 (e.g., a random number generator output a value −0.25 for dx(t)=4). Thus at t=4, a displaced value for d(x) would be 2.75 (dx(t)+x(t)). However, purely random displacement distortions do not correlate to typical human activities, such as handwriting, drawing, speaking, etc.

Now regarding FIG. 24, an elastically distorted function 2400 is illustrated after the purely random function 2300 (FIG. 23) has been smoothed with respect to time. Any suitable smoothing function can be utilized to smooth the function 2300. In accordance with one aspect of the present invention, the function 2300 can be convolved with a Gaussian of standard deviation σ to thereby smooth such function 2300. However, it is to be understood that the function 2300 can be convolved with any suitable shape (e.g., a square) to achieve desirable elastic distortion. Moreover, any other suitable smoothing function, such as a low order polynomial that utilizes random values as coefficients, can be employed in connection with the present invention. The smoothed function 2400 can optionally be multiplied by a scalar to facilitate desirable elastic distortion of the trajectory 2002.

Figure 26:
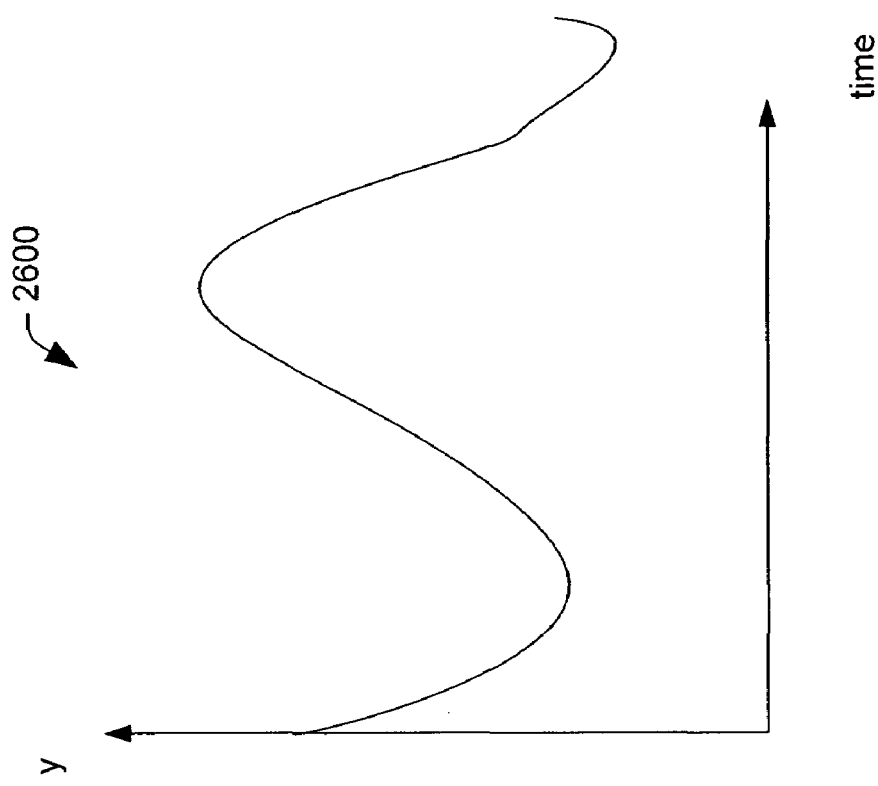
FIGS. 25 and 26 are exemplary graphs of functions of time x(t) and y(t) that represent a trajectory after displacement distortions have been added to functions defining the trajectory in accordance with an aspect of the present invention.
Figure 25:
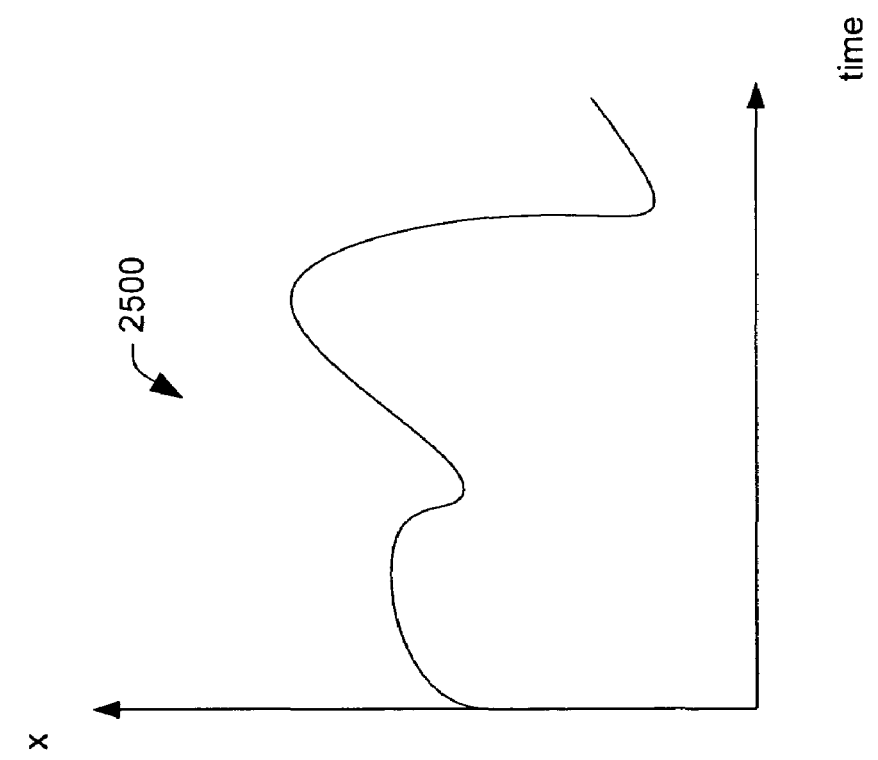

Referring now to FIGS. 25 and 26, exemplary graphs 2500 and 2600 are generated upon adding the function 2400 (FIG. 24) to the functions x(t) 2100 (FIG. 21) and y(t) (FIG. 2200). The exemplary graphs 2500 and 2600 illustrate how x(t) and y(t) are distorted when the function 2400 is added to initial functions x(t) 2100 and y(t) 2200. Thus randomly displacing time values and then smoothing such random displacements facilitates elastically distorting a digital image. Prior to re-generating the character 2002 based upon the functions x(t) 2500 and y(t) 2600, point(s) defining the trajectory can be interpolated to facilitate computation of optimal pixel location for each point.

Turning now to FIG. 27, an elastically distorted character 2700 is illustrated. The character 2700 is an elastic distortion of character 2002 (FIG. 20), wherein the elastic distortions were achieved via generating displacement distortions dx(t) and dy(t) and adding such distortions to the functions x(t) and y(t) defining the trajectory 2002. One-dimensional distortion enables elastic distortions not possible with two-dimensional elastic distortion. For instance, turning briefly to FIG. 20, at time $t_2$ lines of the character 2002 intersect at a particular position in the y-direction. Returning to FIG. 27, it can be easily discerned that generation of the elastically distorted character 2700 can result in positioning of such intersection to alter (e.g., the intersection of the elastically distorted character 2700 is much higher on the y-axis when compared with the character 2002). Utilizing one-dimensional elastic distortion facilitates generation of a substantial amount of additional data that can be employed in connection with training a classifier. For example, FIGS. 6-8 illustrate various deformations that are possible with one-dimensional elastic distortion that are not possible utilizing two-dimensional elastic distortion.

Figure 28:
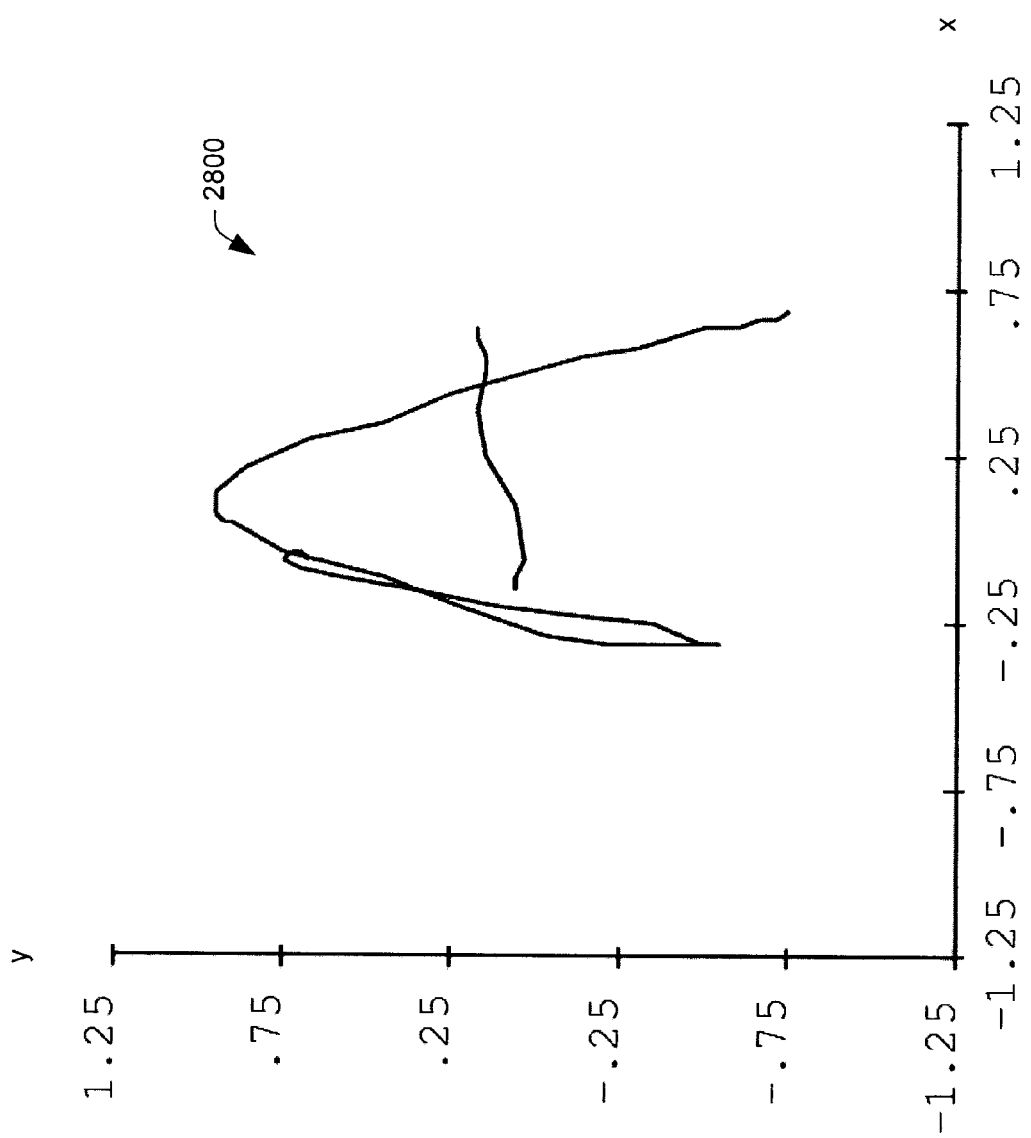
FIG. 28 is an exemplary trajectory captured by a pressure-sensitive screen in connection with a computing device in accordance with an aspect of the present invention.
Figure 29:
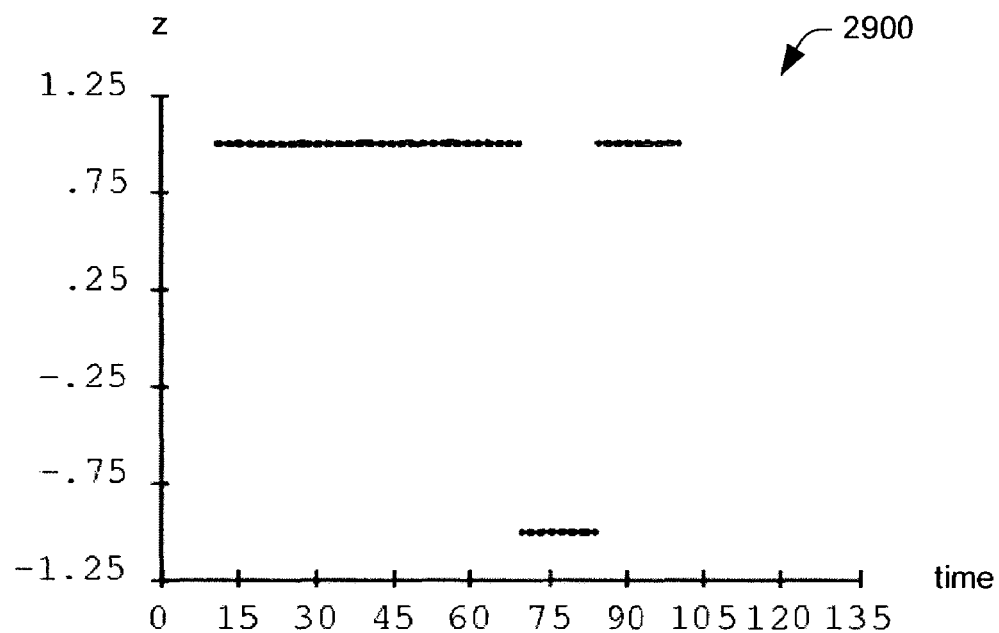
FIG. 29 illustrates periods of time that a pen is depressed against a pressure-sensitive screen in accordance with an aspect of the present invention.
Figure 30:
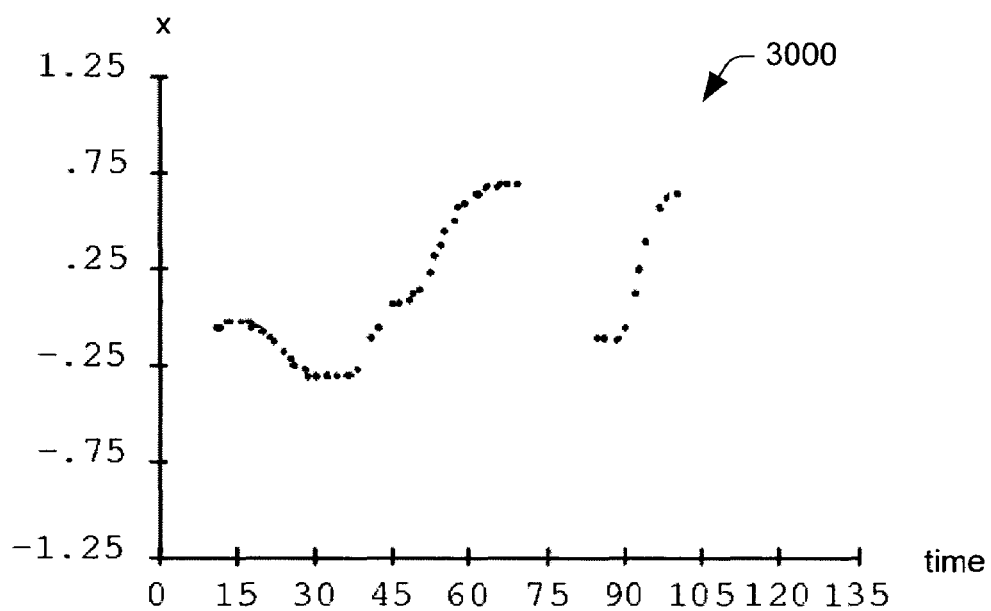
FIGS. 30 and 31 are exemplary functions x(t) and y(t) that define a trajectory in accordance with an aspect of the present invention.
Figure 31:
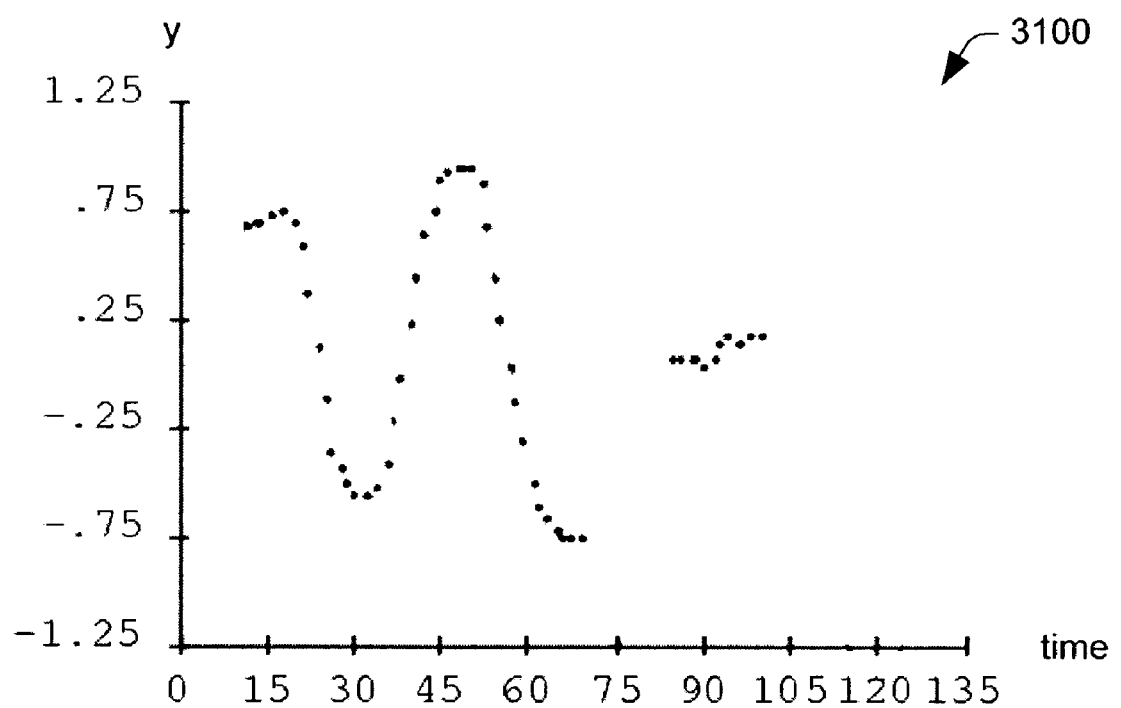

Turning briefly to FIGS. 28-31, an exemplary character (trajectory) captured via a pressure-sensitive screen on a portable computer and corresponding trajectories is illustrated. Turning first to FIG. 28, a character "A" 2800 has been entered via a touch sensitive screen and sampled in an x-dimension and y-dimension with respect to time. The character 2800 can be entered by depressing a pen or other similar device onto a pressure-sensitive screen. Now referring to FIG. 29, a graph 2900 illustrating points in time when a pen was depressed on the pressure-sensitive screen and when the pen was removed from the pressure sensitive screen is illustrated. For example, approximately between times 15 and 70 as well as 85 to 105 the pen was depressed against the pressure-sensitive screen. Approximately between times 70 and 85 the pen was removed from the pressure sensitive screen. Turning now to FIGS. 30 and 31, functions x(t) 3000 and y(t) 3100 defining the character 2800 (FIG. 28) are illustrated. Displacement distortions can thereafter be generated and added to the functions x(t) and y(t) to create an elastic distortion of the character (trajectory) 2800.

Figure 32:
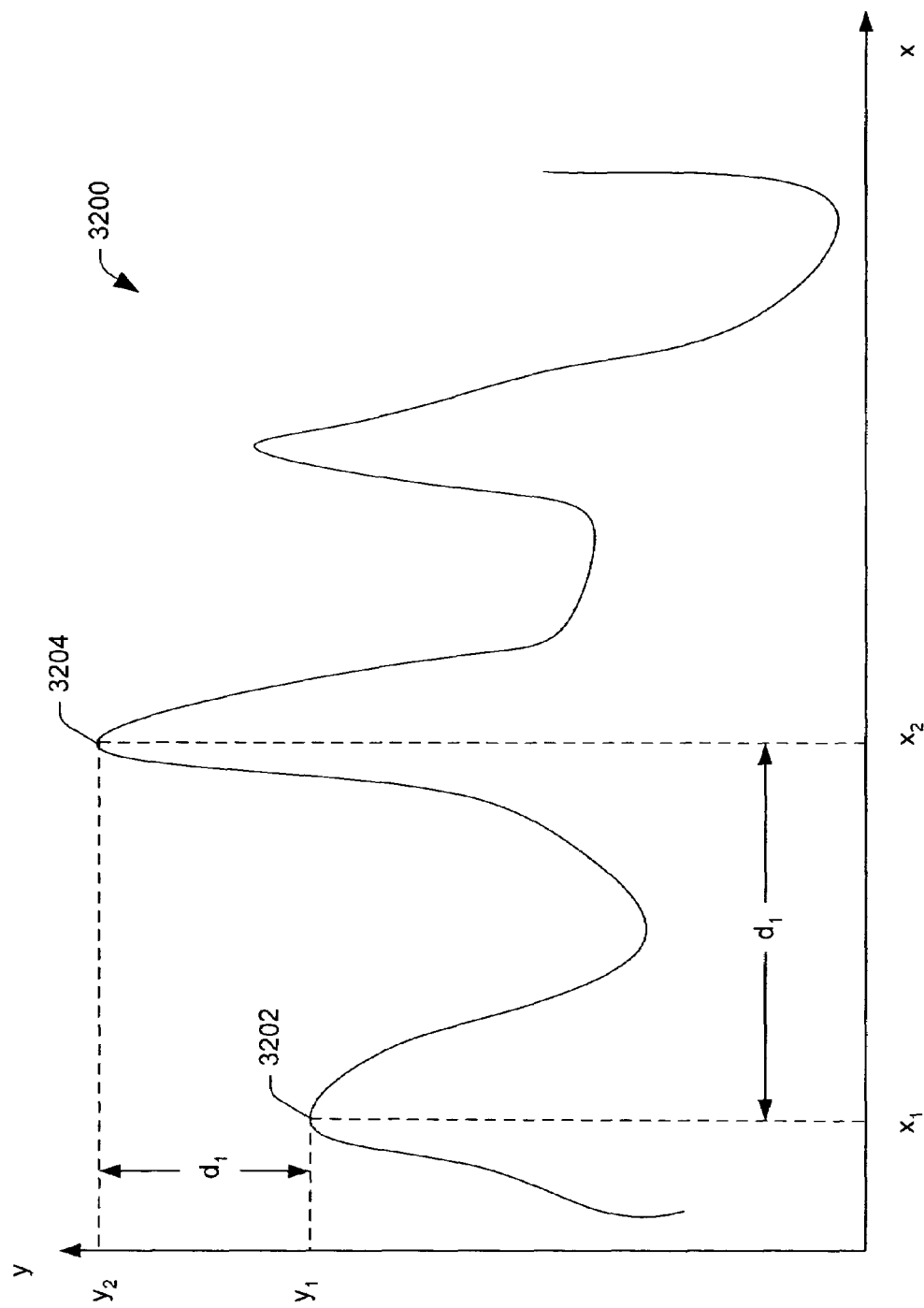
FIG. 32 is an exemplary graphical image of a sound in accordance with an aspect of the present invention.

Now referring to FIG. 32, an exemplary digital image 3200 of a captured sound is illustrated. Such captured sound can be a spoken word, series of words, etc. The image 3200 can be desirably utilized as labeled training data for a classifier, which can be employed to recognize and/or analyze similar sound(s). The digital image 3200 includes peaks 3202 and 3204, located at positions $(x_1, y_1)$ and $(x_2, Y_2)$ respectively. Such peaks 3202 and 3204 can represent peaks in volume, a particular voice inflection, etc., and $d_1$ and $d_2$ represent disparity of such peaks 3202 and 3204 in the y and x direction, respectively.

Figure 33:
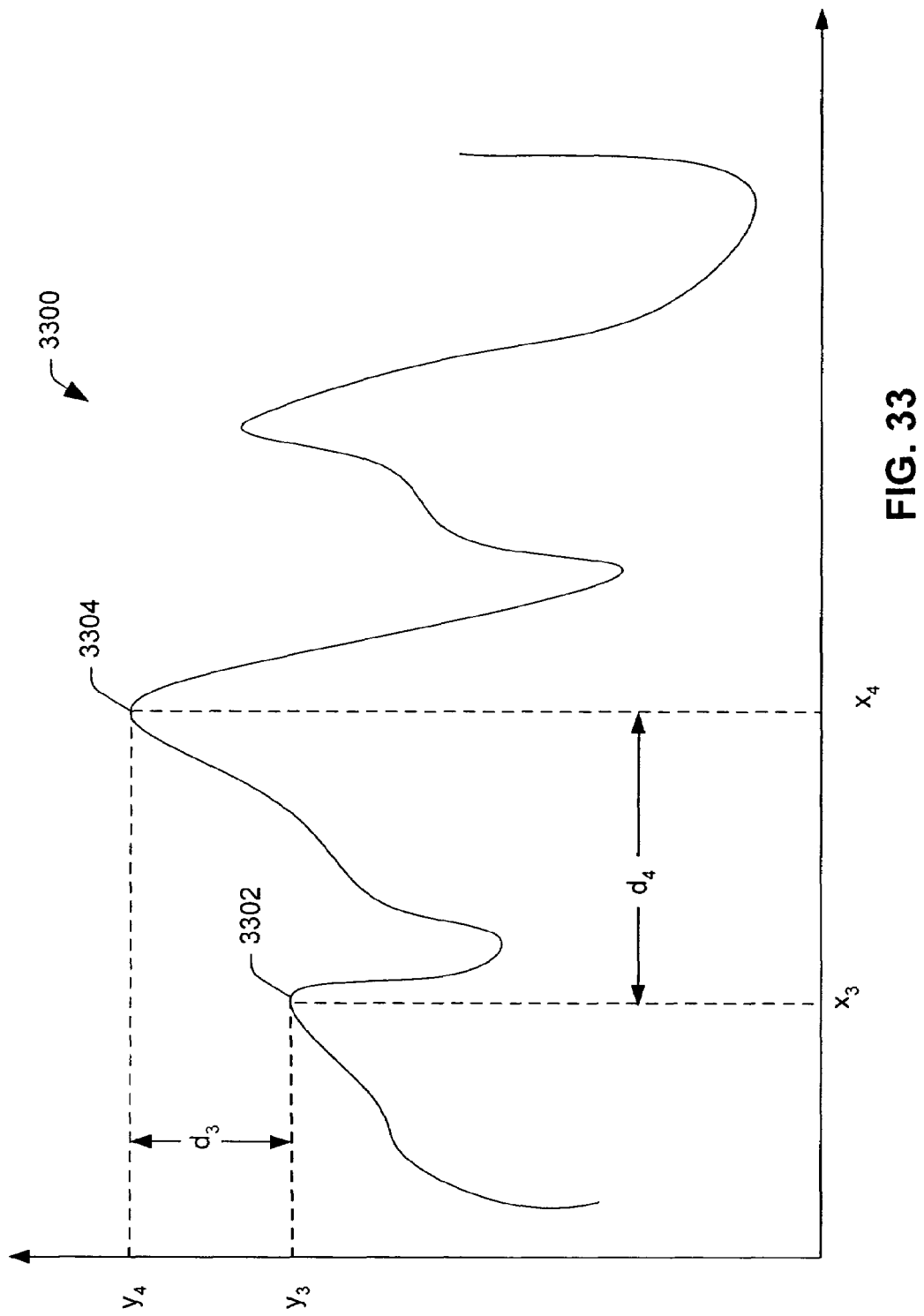
FIG. 33 is an elastically distorted graphical image of a sound in accordance with an aspect of the present invention.

Turning now to FIG. 33, an exemplary elastically distorted digital image 3300 based upon the digital image 3200 (FIG. 32) is illustrated. In accordance with an aspect of the present invention, the digital image 3200 can be distorted in a plurality of manners to generate training data employed in training a classifier that facilitates voice recognition and/or analysis. As the digital image 3200 represents a particular sound, the digital image 3300 represents an elastic distortion of such sound. For instance, the elastically distorted digital image 3300 can represent a southern accent of the sound corresponding to digital image 3200. Furthermore, the distorted digital image 3300 can represent plausible variations in volume, pitch, syllable elongation, etc. of a particular user who has entered the sound corresponding to digital image 3200 as training data for a classifier.

More particularly, the elastically distorted image includes peaks 3302 and 3304, which are located at positions $(x_3, y_3)$ and $(x_4, y_4)$, respectively. Furthermore, peaks 3302 and 3304 are separated by $d_3$ and $d_4$, respectively. Position of the peaks 3302 and 3304 and disparity of displacement between the peaks 3302 and 3304 are different from position of peaks 3202 and 3204 (FIG. 32) and distance between such peaks 3202 and 3204. Such differences can occur via one-dimensional and/or two-dimensional elastic distortion performed on the digital image 3200, thereby creating additional labeled data (e.g., digital image 3300) utilized for training a classifier that can recognize and/or analyze speech.

Figure 35:
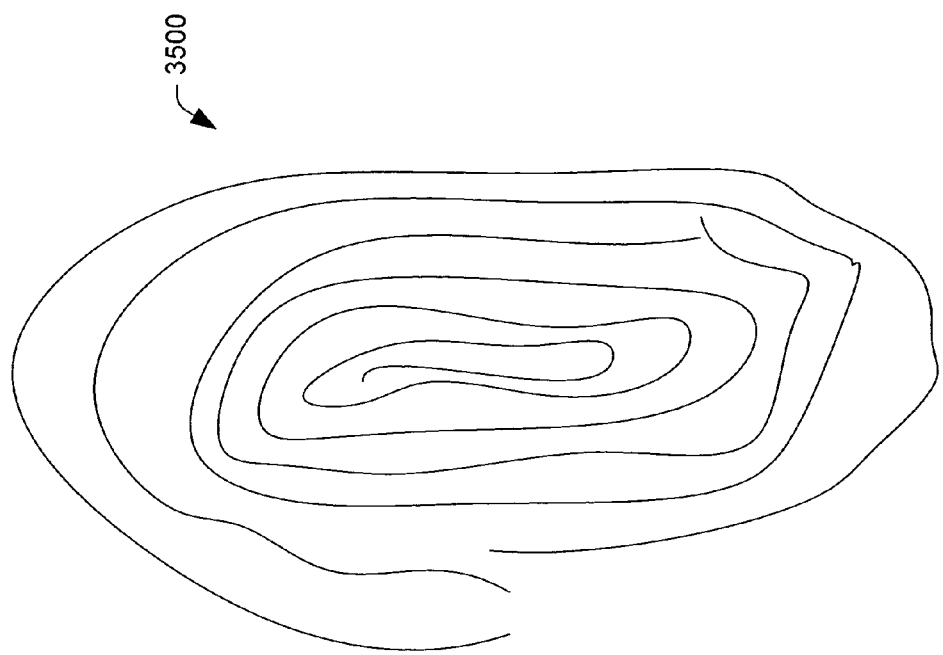
FIG. 35 illustrates a fingerprint that has been elastically distorted in accordance with an aspect of the present invention.
Figure 34:
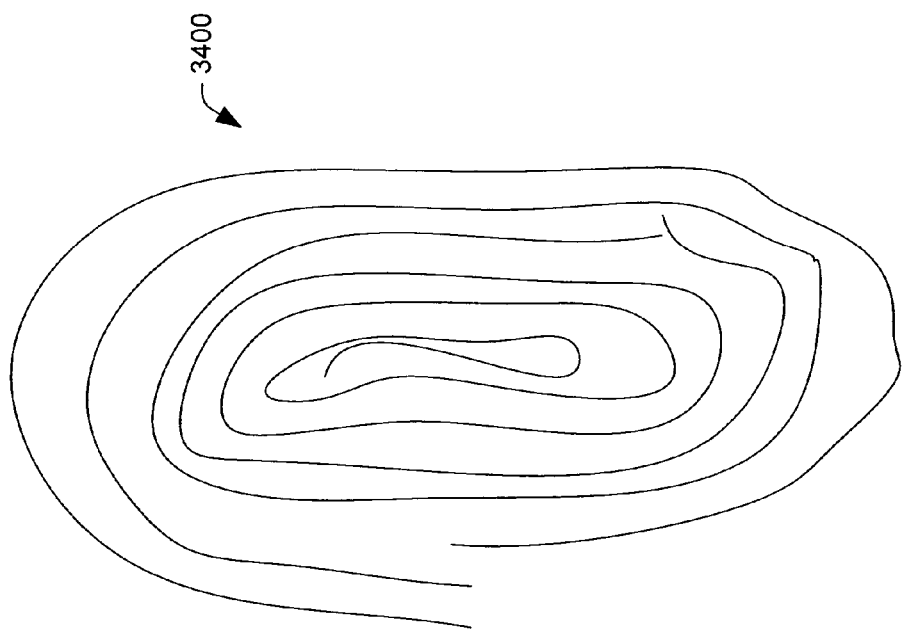
FIG. 34 is an exemplary fingerprint that can be utilized to train a classifier in accordance with an aspect of the present invention.

Now referring briefly to FIG. 34, an exemplary digital image 3400 of a particular fingerprint is illustrated. The fingerprint can be utilized as labeled data employed to train a classifier in order to facilitate recognition and/or analysis of such fingerprint. Turning to FIG. 35, an exemplary digital image 3500 that has been generated via elastic distortion of digital image 3400 (FIG. 34) is illustrated. The digital image 3400 can be elastically distorted in one and/or two dimensions as described supra. The generated digital image 3500 can thereafter be utilized as labeled data that can be employed in connection with training a classifier. The elastically distorted image 3500 can represent, for example, disparate pressure in different portions of a fingerprint represented by the initial digital image 3400. Utilization of the present invention in connection with fingerprint analysis and/or recognition can facilitate efficient recognition of fingerprints given a database comprising a plurality of disparate fingerprints. Moreover, as classifiers are typically very good at determining inverse problems, given a set of elastically distorted training data the classifier can infer invariance of such data.

Figure 36:
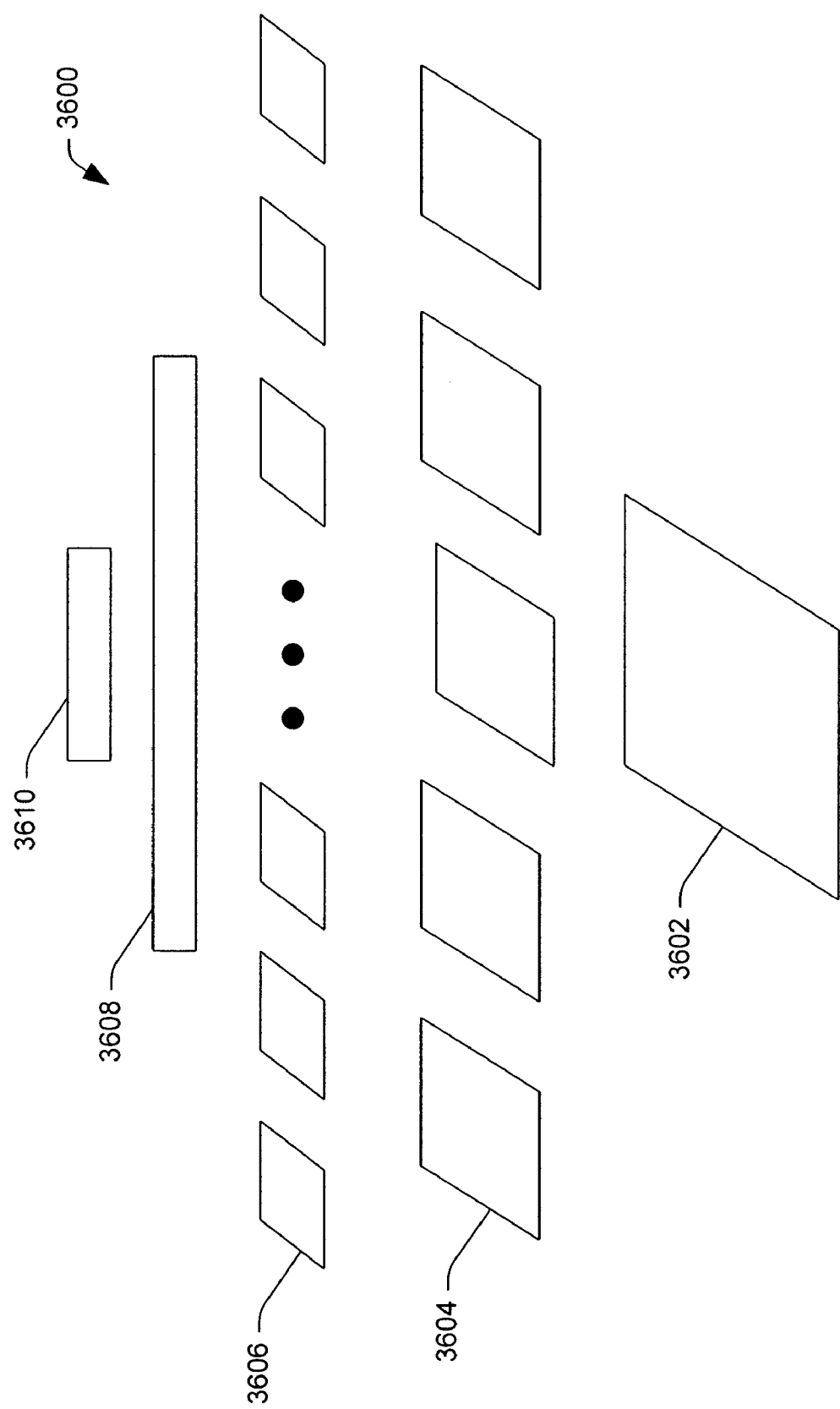
FIG. 36 illustrates an exemplary neural network that can accept elastically distorted labeled data in accordance with an aspect of the present invention.

Turning now to FIG. 36, an exemplary system 3600 that can receive labeled training data in connection with the present invention is illustrated. In accordance with one aspect of the present invention, the system 3600 can be a convolutional neural network. However, it is to be understood that Bayesian belief networks, support vector machines, variational methods, boosting algorithms, and other similar learning algorithms and/or systems can be employed as systems that can recognize and/or analyze labeled data in connection with the present invention. The system 3600 can be structured according to input data, and for exemplary purposes the system 3600 is structured to receive training data from the MNIST dataset and further recognize and/or analyze data from such dataset. MNIST is a benchmark dataset of images of segmented handwritten digits, each with 28×28 pixels.

The architecture of the system 3600 enables extraction of simple features at a higher resolution that can thereafter be converted into more complex features at a coarser resolution. In accordance with one aspect of the present invention, sub-sampling a layer by a factor of two achieves such generation of coarser resolution. This, in turn, is a clue to desirable size of a kernel of the system 3600, which for exemplary purposes is illustrated at five layers. The input layer 3602 of the system 3600 is 29×29, as the zinitial MNIST input size is 28×28, and 29×29 is the nearest value that can generate an integer size after two layers of convolution.

Convolution layers 3604 and 3606 can be utilized to extract particular feature(s) delivered from the input layer 3602 that can be employed in training the system 3600. For example, convolution layer 3604 can facilitate extraction of five 13×13 features from the input of one 29×29 feature. Such convolution layer 3604 extracts very simple features, which after training of the system 3600 appear similar to edge, ink, or intersection detectors. Moreover, the system 3600 can extract more or less than five features, as such convolution layer 3604 is merely exemplary. Convolution layer 3606 can thereafter extract more particular features from the five 13×13 features into fifty 5×5 features. When viewed together, the convolution layers 3604 and 3606 can be categorized as a trainable feature extractor.

Layers 3608 and 3610 can be viewed as a classifier that is trained via features extracted by the convolution layers 3604 and 3606. The layers 3608 and 3610 are two fully connected layers, thereby together creating a universal classifier. A number of hidden units (not shown) can be associated with the layers 3608 and 3610, thereby facilitating optimal classification. The number of hidden layers is variable, wherein the number chosen controls capacity and generalization of the system 3600. For example, as MNIST comprises ten classes, 100 hidden units is appropriate.

In accordance with one aspect of the present invention, for sake of simplicity cross-entropy (CE) and mean squared error (MSE) are two disparate error functions that can be utilized to test such a neural network. Other error detection strategies, such as momentum, weight decay, structure-dependent learning rates, padding inputs, averaging rather than sub-sampling, etc. can be employed in connection with the present invention.

The system 3600 can be tested modularly via utilizing back-propagation techniques. For example, an assumption can be made that a module M has a forward propagation function that computes an output M(I, W) as a function of input I and parameters W. The module M must also then have a backward propagation function (with respect to the input I) that computes an input gradient as a function of an output gradient, as well as a gradient function (with respect to a weight) that can compute a weight gradient with respect to the output gradient, and a weight update function that adds the weight gradients to the weights via utilizing update rules such as batch, stochastic, momentum, weight decay, etc.

The Jacobian matrix of the module M is $$J_{ki} \equiv \frac{\partial M_k}{\partial x_i}.$$

Utilizing the backward propagation function and the gradient function, the Jacobian matrices $$\frac{\partial I}{\partial M(I, W)}$$

and $$\frac{\partial W}{\partial M(I, W)}$$

can be computed via feeding (gradient) unit vectors $\Delta M_k(I, W)$ to the backward propagation function and the gradient function, where k indexes all output units of M, and only unit k is set to one while all others are set to 0. Conversely, arbitrarily accurate estimates of the Jacobian matrices $$\frac{\partial M(I, W)}{\partial I} \quad \text{and} \quad \frac{\partial M(I, W)}{\partial W}$$

can be achieved by adding small variations $\epsilon$ to I and W and calling the M(I, W) function. A determination can be made that the forward propagation accurately corresponds to the backward and gradient propagation via utilizing the equalities $$\frac{\partial I}{\partial M} = F\left(\frac{\partial M}{\partial I}\right)^T \quad \text{and} \quad \frac{\partial W}{\partial M} = F\left(\frac{\partial M}{\partial W}\right)^T,$$

where F is a function that inverts each element of a selected matrix. It is noteworthy that the backward propagation computes $$F\left(\frac{\partial I}{\partial M(I, W)}\right)$$

directly so that only a transposition is required to compare it with the Jacobian computed via forward propagation. In other words, if the equalities above are verified to a precision of a machine, learning is implemented correctly. Such modular debugging is particularly useful for large networks as incorrect implementations can yield reasonable results (e.g., learning algorithms can be robust even to bugs).

In one exemplary implementation, a neural network(s) utilized in connection with the present invention can be C++ module(s) that are combination(s) of more basis module(s). A module test program instantiates a module in double precision, and can select ϵ equal to $10^{-12}$ (a machine precision for double precision can be $10^{-16}$), can further generate random values for I and W, and perform a correctness test to a precision of $10^{-10}$.

If a larger module fails such test, each submodule can be tested to determine where failures originate. Such a procedure can save a considerable amount of time otherwise utilized to debug a neural network.

Figure 37:
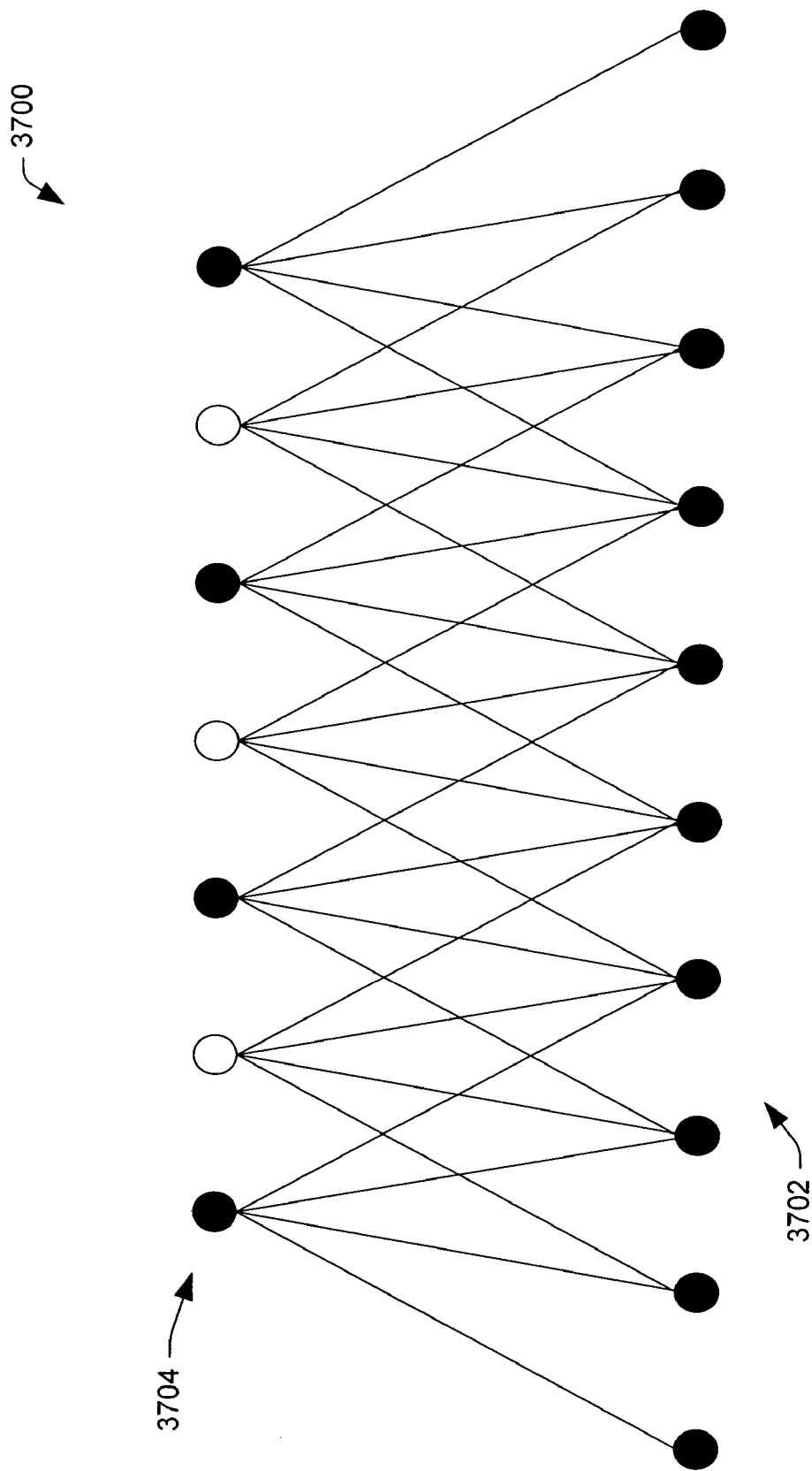
FIG. 37 illustrates a detailed interconnection of units within a neural network in accordance with an aspect of the present invention.

Now referring to FIG. 37, an exemplary grouping of units 3700 of a neural network that can be employed as a classifier (not shown) in accordance with one aspect of the present invention is illustrated. For instance, the neural can receive labeled training data generated via elastic distortions of an initial set of training data. Fully connected neural networks typically utilize the following rules to implement forward and backward propagation:

$$x_j^{L+1} = \sum_i w_{j,i}^{L+1} x_i^L \quad \text{and} \quad g_i^L = \sum_j w_{j,i}^{L+1} g_j^{L+1}$$

where $x_i^L$ and $g_i^L$ are an activation and gradient of unit i at layer L, respectively, and $w_{j,i}^{L+1}$ is a weight connecting unit i at layer L to unit j at layer L+1. Such rules can be viewed as activation units of a higher layer "pulling" activations of all units connected to such activation units. Similarly, units of a lower layer are pulling gradients of all units connected to the units of the lower layer. Such pulling strategy, however, can be complex and difficult to implement when computing gradients of a convolutional neural network, as a number of connections leaving each unit is not constant due to border effects.

For example, all units of a layer 3702 (e.g., $g_i^0$) have a variable number of outgoing connections. In contrast, all units on a layer 3704 (e.g., $g_i^1$) have a fixed number of incoming connections. To simplify computation, rather than "pulling" a gradient from the layer 3702, a gradient from the layer 3704 can be "pushed." The resulting equation is:

$$g_{j+1}^L += w_i^{L+1} g_j^{L+1}.$$

For each unit j in the layer 3704, a fixed number of units i from the layer 3702 can be updated. As weights are shared in convolution, w does not depend upon j. In some contexts "pushing" can require more computing time than "pulling", due to gradients accumulating in memory during "pushing" as opposed to gradients accumulating in registers during "pulling." For large convolutions, however, "pushing" a gradient can be faster, and can be utilized to take advantage of particular processor's instruction sets (e.g., Intel SSE) because all memory accesses are contiguous. In regards to implementing the convolutional network, "pulling" an activation and "pushing" the gradient is a simple manner for implementation.

In an exemplary trial utilizing neural networks trained via a portion of the MNIST dataset for training the neural networks and the remainder for analyzing performance of such networks, the following results were achieved.

| Algorithm | Distortion | Error |
|---|---|---|
| 2 layer MLP (CE) | None | 1.6% |
| 2 layer MLP (CE) | affine | 1.1% |
| 2 layer MLP (MSE) | elastic | 0.9% |
| 2 layer MLP (CE) | elastic | 0.7% |
| Simple conv (CE) | affine | 0.6% |
| Simple conv (CE) | elastic | 0.4% |

Both fully connected and convolutional neural networks (e.g., system 3600) were utilized to obtain the above results, and the first 50,000 patterns of the MNIST dataset were utilized for training while the remaining 10,000 were utilized for validation and parameter adjustments. The two-layer Multi-Layer Perceptron (MLP) (e.g., system 3600) had 800 hidden units. As can be seen from data in the table above, elastically distorting training data to generate additional training data improved performance of all neural networks when compared to affine distribution. Moreover, it can be observed that convolution neural networks outperform two layer MLPs. Finally, it is to be noted that elastically distorting training data delivered to a convolutional neural network has resulted in lowest error percentage known to date.

Figure 38:
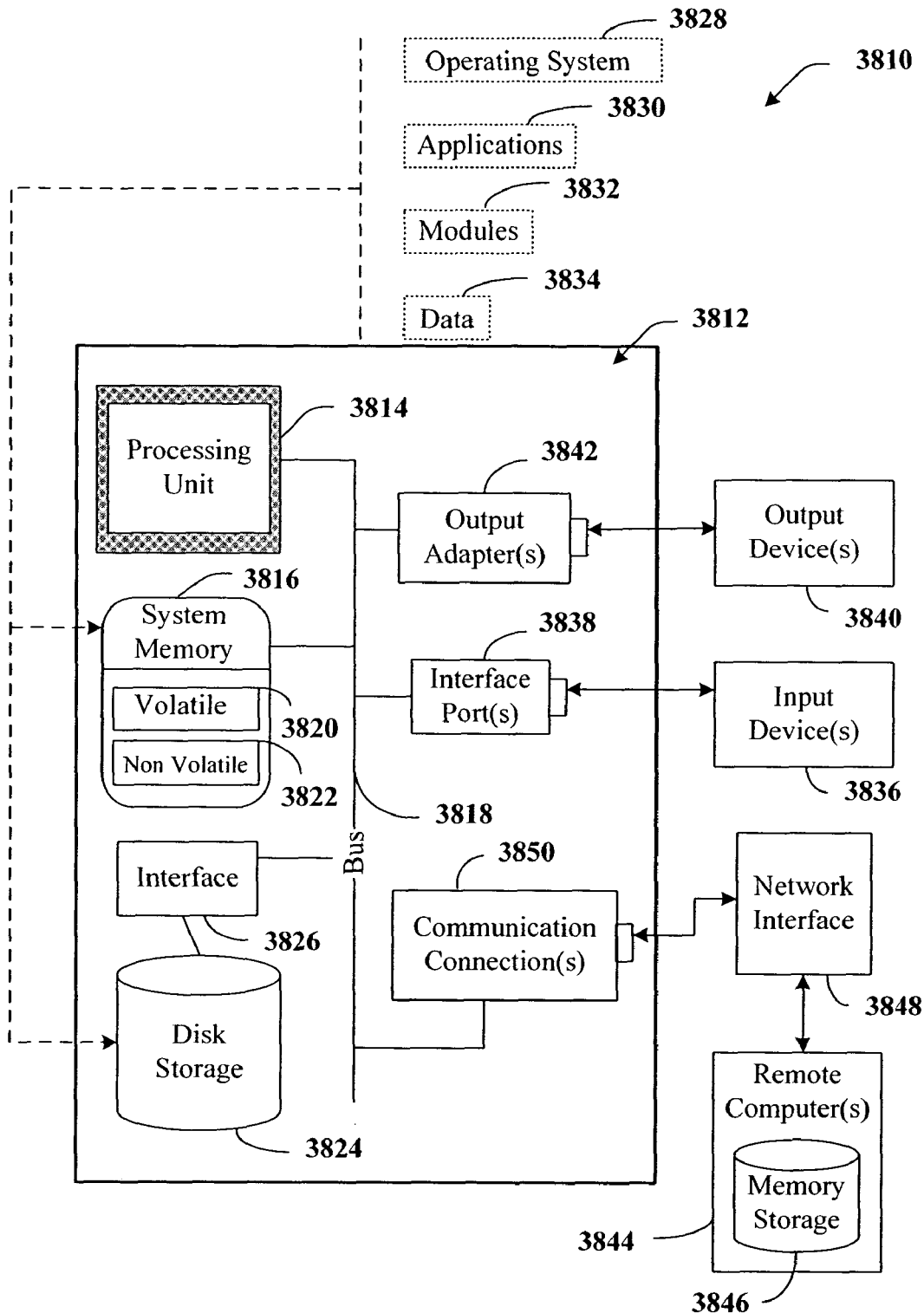
FIG. 38 illustrates an example operating environment in which the present invention may function.

With reference to FIG. 38, an exemplary environment 3810 for implementing various aspects of the invention includes a computer 3812. The computer 3812 includes a processing unit 3814, a system memory 3816, and a system bus 3818. The system bus 3818 couples system components including, but not limited to, the system memory 3816 to the processing unit 3814. The processing unit 3814 can be any of various available processors. Dual microprocessors and other multiprocessor architectures also can be employed as the processing unit 3814.

The system bus 3818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 3816 includes volatile memory 3820 and nonvolatile memory 3822. The basic input/output system (BIOS), containing the basic routines to transfer information between elements within the computer 3812, such as during start-up, is stored in nonvolatile memory 3822. By way of illustration, and not limitation, nonvolatile memory 3822 can include read only memory (ROM), programmable ROM (PROM), electrically programmable ROM (EPROM), electrically erasable ROM (EEPROM), or flash memory. Volatile memory 3820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 3812 also includes removable/nonremovable, volatile/nonvolatile computer storage media. FIG. 38 illustrates, for example a disk storage 3824. Disk storage 3824 includes, but is not limited to, devices like a magnetic disk drive, floppy disk drive, tape drive, Jaz drive, Zip drive, LS-100 drive, flash memory card, or memory stick. In addition, disk storage 3824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 3824 to the system bus 3818, a removable or non-removable interface is typically used such as interface 3826.

It is to be appreciated that FIG. 38 describes software that acts as an intermediary between users and the basic computer resources described in suitable operating environment 3810. Such software includes an operating system 3828. Operating system 3828, which can be stored on disk storage 3824, acts to control and allocate resources of the computer system 3812. System applications 3830 take advantage of the management of resources by operating system 3828 through program modules 3832 and program data 3834 stored either in system memory 3816 or on disk storage 3824. It is to be appreciated that the present invention can be implemented with various operating systems or combinations of operating systems.

A user enters commands or information into the computer 3812 through input device(s) 3836. Input devices 3836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3814 through the system bus 3818 via interface port(s) 3838. Interface port(s) 3838 include, for example, a serial port, a parallel port, a game port, and a universal serial bus (USB). Output device(s) 3840 use some of the same type of ports as input device(s) 3836. Thus, for example, a USB port may be used to provide input to computer 3812, and to output information from computer 3812 to an output device 3840. Output adapter 3842 is provided to illustrate that there are some output devices 3840 like monitors, speakers, and printers among other output devices 3840 that require special adapters. The output adapters 3842 include, by way of illustration and not limitation, video and sound cards that provide a means of connection between the output device 3840 and the system bus 3818. It should be noted that other devices and/or systems of devices provide both input and output capabilities such as remote computer(s) 3844.

Computer 3812 can operate in a networked environment using logical connections to one or more remote computers, such as remote computer(s) 3844. The remote computer(s) 3844 can be a personal computer, a server, a router, a network PC, a workstation, a microprocessor based appliance, a peer device or other common network node and the like, and typically includes many or all of the elements described relative to computer 3812. For purposes of brevity, only a memory storage device 3846 is illustrated with remote computer(s) 3844. Remote computer(s) 3844 is logically connected to computer 3812 through a network interface 3848 and then physically connected via communication connection 3850. Network interface 3848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3850 refers to the hardware/software employed to connect the network interface 3848 to the bus 3818. While communication connection 3850 is shown for illustrative clarity inside computer 3812, it can also be external to computer 3812. The hardware/software necessary for connection to the network interface 3848 includes, for exemplary purposes only, internal and external technologies such as, modems including regular telephone grade modems, cable modems and DSL modems, ISDN adapters, and Ethernet cards.

Figure 39:
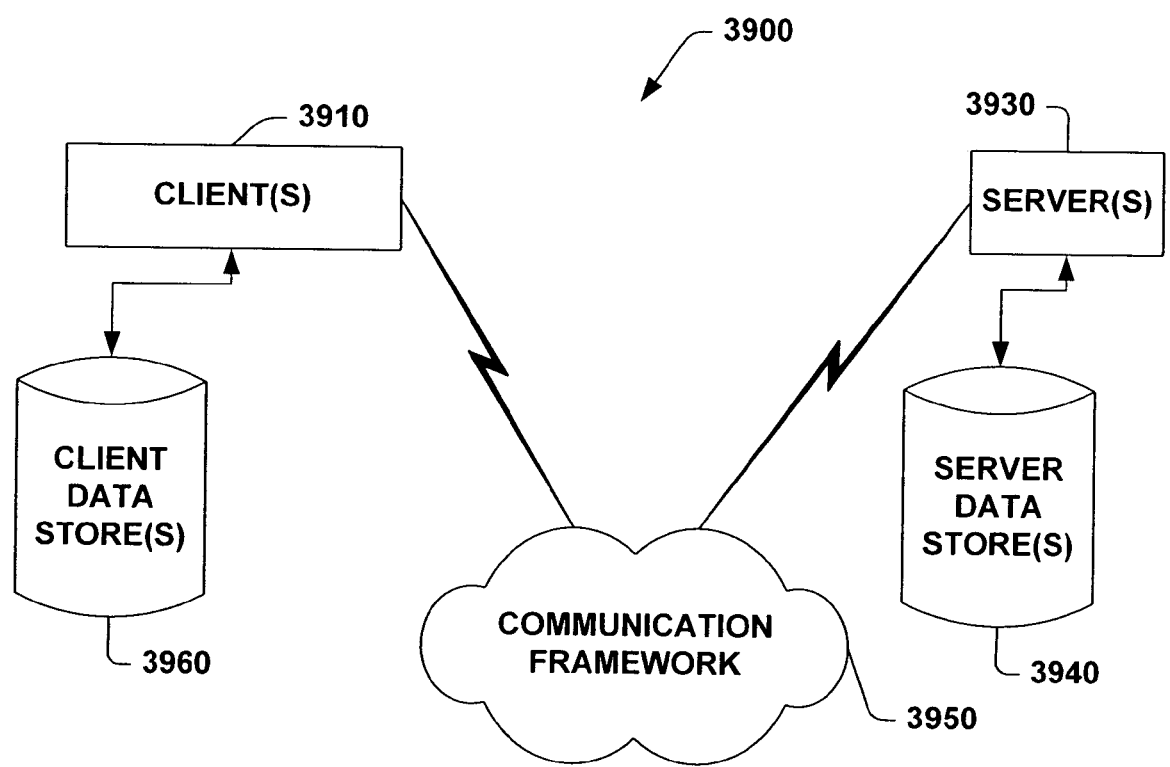
FIG. 39 is a schematic block diagram of a sample-computing environment with which the present invention can interact.

FIG. 39 is a schematic block diagram of a sample-computing environment 3900 with which the present invention can interact. The system 3900 includes one or more client(s) 3910. The client(s) 3910 can be hardware and/or software (e.g., threads, processes, computing devices). The system 3900 also includes one or more server(s) 3930. The server(s) 3930 can also be hardware and/or software (e.g., threads, processes, computing devices). The servers 3930 can house threads to perform transformations by employing the present invention, for example. One possible communication between a client 3910 and a server 3930 may be in the form of a data packet adapted to be transmitted between two or more computer processes. The system 3900 includes a communication framework 3950 that can be employed to facilitate communications between the client(s) 3910 and the server(s) 3930. The client(s) 3910 are operably connected to one or more client data store(s) 3960 that can be employed to store information local to the client(s) 3910. Similarly, the server(s) 3930 are operably connected to one or more server data store(s) 3940 that can be employed to store information local to the servers 3930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates training a classifier, comprising:
    a component that receives a data set to be employed in connection with training the classifier, a subset of the received data set describes a digital trajectory(ies), wherein the digital trajectory(ies) are defined by point(s) that have associated position and time values to enable the trajectory(ies) to be defined by equations x(t) and y(t); and
    an expansion component that applies elastic distortion algorithm(s) to a subset of the data set to generate additional training data.

2. A classifier trained using the additional data generated via the system of claim 1.

3. The classifier of claim 2 employed for at least one of handwriting, speech, and object analysis.

4. The classifier of claim 2 being at least one of a neural network, a Bayesian belief network, a support vector machine, a boosting algorithm, and a variational method system.

5. The classifier of claim 2 being at least one of a convolutional neural network and a two layer Multi-Layer Perceptron neural network.

6. The system of claim 1, wherein the system can infer transformation invariance of the data set.

7. The system of claim 1, the received data set being digital image(s) defined by one or more pixel(s).

8. The system of claim 7, the expansion component associated with a random number generator employed to facilitate creation of a random displacement field via displacing the pixel(s) according to output values of the random number generator.

9. The system of claim 8, further comprising a low-pass filter that is applied to the displacement field to facilitate smoothing such displacement field.

10. The system of claim 9, further comprising an artificial intelligence component that infers a type of low-pass filter and parameters of the filter to be utilized given at least one of user, user state, user history, computing state, available computing resources, and classifier architecture.

11. The system of claim 9, further comprising a scaling component for scaling the filtered displacement field.

12. The system of claim 9, the displacement field applied to the image(s) to elastically distort such image(s).

13. The system of claim 12, further comprising an interpolation component that facilitates computation of position(s) of pixel(s) that define the elastically distorted image(s) and appropriate color value(s) relating to such position(s).

14. A classifier trained at least in part upon the elastically distorted image(s) of claim 13, the classifier employed to at least one of recognize and analyze one or more of handwriting, speech, and object(s).

15. The system of claim 7, wherein the elastic distortions of one or more digital image(s) are obtained by applying a smooth displacement field to the digital image(s).

16. The system of claim 15, wherein a random number generator is employed to facilitate generation of the smooth displacement field.

17. The system of claim 15, further comprising:
a low order polynomial; and
a random number generator, wherein values output by the random number generator are utilized as coefficient(s) of the low order polynomial.

18. The system of claim 15, wherein the smooth displacement field is obtained by over-sampling a low resolution displacement field, the low resolution displacement field generated at least in part by random numbers output from a random number generator.

19. The system of claim 15 wherein the smooth displacement field is obtained by applying a low-pass filter over a noisy field.

20. The system of claim 19, wherein convolution techniques are utilized as the low-pass filter.

21. The system of claim 20, wherein the displacement field is convolved with a Gaussian of standard deviation σ.

22. The system of claim 21, the displacement field convolved in one dimension at a time.

23. The system of claim 1, the subset of the received data set obtained via a pressure-sensitive screen, and the time-values obtained via time-sampling inputs to the pressure-sensitive screen.

24. The system of claim 1, the time value(s) obtained via assigning time values to known positions according to at least one of known human writing, speaking, and drawing techniques.

25. The system of claim 1, the expansion component associated with a random number generator employed to facilitate creation of a random displacement field as a function of time, the displacement field being added to the equations x(t) and y(t).

26. The system of claim 1, wherein elastic distortions of a trajectory are obtained by adding a smooth displacement field to the trajectory.

27. The system of claim 26, wherein a random number generator is employed to facilitate generation of the smooth displacement field.

28. The system of claim 26, further comprising:
a low order polynomial; and
a random number generator, wherein values output by the random number generator are utilized as coefficient(s) of the low order polynomial.

29. The system of claim 26, wherein the smooth displacement field is obtained by over-sampling a low resolution displacement field, the low resolution displacement field generated at least in part by random numbers output from a random number generator.

30. The system of claim 26 wherein the smooth displacement field is obtained by applying a low pass filter over a noisy field.

31. The system of claim 30, wherein convolution techniques are utilized as the low-pass filter.

32. The system of claim 30, further comprising an artificial intelligence component that infers a type of low-pass filter and parameters of the filter to be utilized given at least one of user, user state, user history, computing state, available computing resources, and classifier architecture.

33. The system of claim 30, wherein convolution techniques are utilized as the low-pass filter.

34. The system of claim 33, wherein the displacement field is convolved with a Gaussian of standard deviation σ.

35. The system of claim 30, further comprising a scaling component that scales the filtered displacement field.

36. The system of claim 35, wherein x(t) and y(t) are re-generated with time value(s) according to the smoothed displacement field to thereby elastically distort the image.

37. A classifier trained at least in part upon the elastically distorted trajectory(ies) of claim 36, the classifier employed to at least one of recognize and analyze one or more of handwriting, speech, and object(s).

38. A portable computing device that employs the system of claim 1.

39. A portable computing device, comprising:
a component that receives a human generated input;
a classifier that was trained via employment of an expansion component that applies elastic distortion algorithm(s) to a subset of a training data set to generate additional training data, and
a random number generator associated with the expansion component employed to facilitate creation of a random displacement field via displacing pixel(s) according to output values of the random number generator, a low-pass filter applied to the displacement field to facilitate smoothing of the displacement field.

* * * * *